(12) United States Patent
Wilmering et al.

(10) Patent No.: US 7,693,900 B2
(45) Date of Patent: Apr. 6, 2010

(54) QUERYING OF DISTRIBUTED DATABASES USING NEUTRAL ONTOLOGY MODEL FOR QUERY FRONT END

(75) Inventors: Timothy J. Wilmering, Chesterfield, MO (US); David A. Van Rossum, Redmond, WA (US); Jun Yuan, Sammamish, WA (US); Joseph R. Herrmann, Ballwin, MO (US); John G. Wilson, St. Louis, MO (US); James M. White, Florissant, MO (US)

(73) Assignee: The Boeing Company, Chicago, IL (US)

( * ) Notice: Subject to any disclaimer, the term of this patent is extended or adjusted under 35 U.S.C. 154(b) by 309 days.

(21) Appl. No.: 11/773,418

(22) Filed: Jul. 4, 2007

(65) Prior Publication Data
US 2008/0077598 A1 Mar. 27, 2008

Related U.S. Application Data

(60) Provisional application No. 60/827,098, filed on Sep. 27, 2006.

(51) Int. Cl.
*G06F 7/00* (2006.01)
(52) U.S. Cl. ...................................... 707/713

(58) Field of Classification Search .................. 707/2
See application file for complete search history.

(56) References Cited

U.S. PATENT DOCUMENTS

2004/0225763 A1* 11/2004 Carroll et al. ............... 710/36
2005/0154701 A1* 7/2005 Parunak et al. .............. 707/1
2007/0112714 A1* 5/2007 Fairweather ................. 706/46

* cited by examiner

*Primary Examiner*—Charles Rones
*Assistant Examiner*—Fazlul Quader
(74) *Attorney, Agent, or Firm*—Ostrager Chong Flaherty & Broitman P.C.

(57) ABSTRACT

According to an embodiment, a method includes constructing a neutral ontology model of a query front end characterized by ontology schemata which subsume the plurality of different databases on the network in order to provide a common semantic interface for use in generating queries for data from any of the different databases, importing respective database metadata representing logical and physical structures of each database subscribed for receiving queries for data from the database using the query front end, constructing mappings of the database metadata representing the logical and physical structures of each subscribed database to the ontology schemata of the query front end, and storing the constructed mappings for use by the query front end for queries through the common semantic interface of the neutral ontology model for data from any of the different databases.

21 Claims, 16 Drawing Sheets

FIG 3A

ONTOLOGY CREATION PROCESS

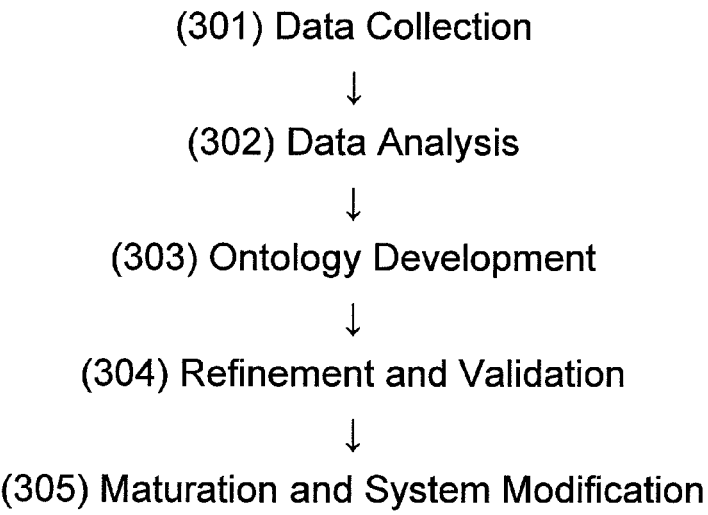

(301) Data Collection
↓
(302) Data Analysis
↓
(303) Ontology Development
↓
(304) Refinement and Validation
↓
(305) Maturation and System Modification

FIG 3B

MAPPING DATABASE SCHEMATA TO DOMAIN ONTOLOGY:

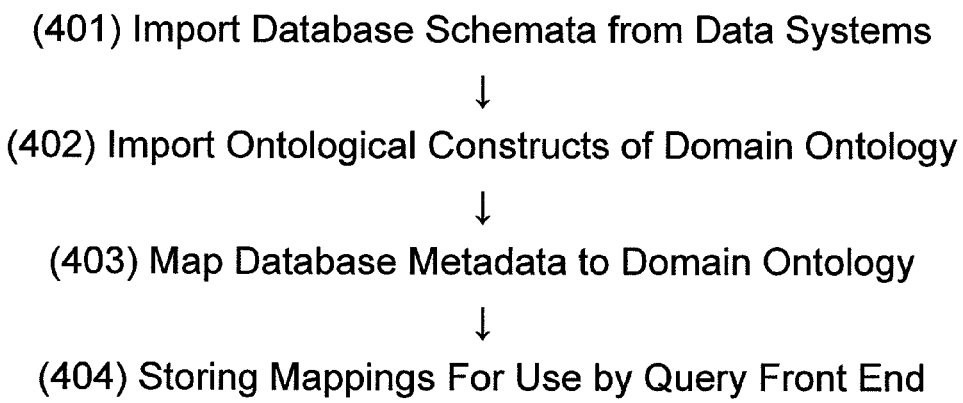

(401) Import Database Schemata from Data Systems
↓
(402) Import Ontological Constructs of Domain Ontology
↓
(403) Map Database Metadata to Domain Ontology
↓
(404) Storing Mappings For Use by Query Front End

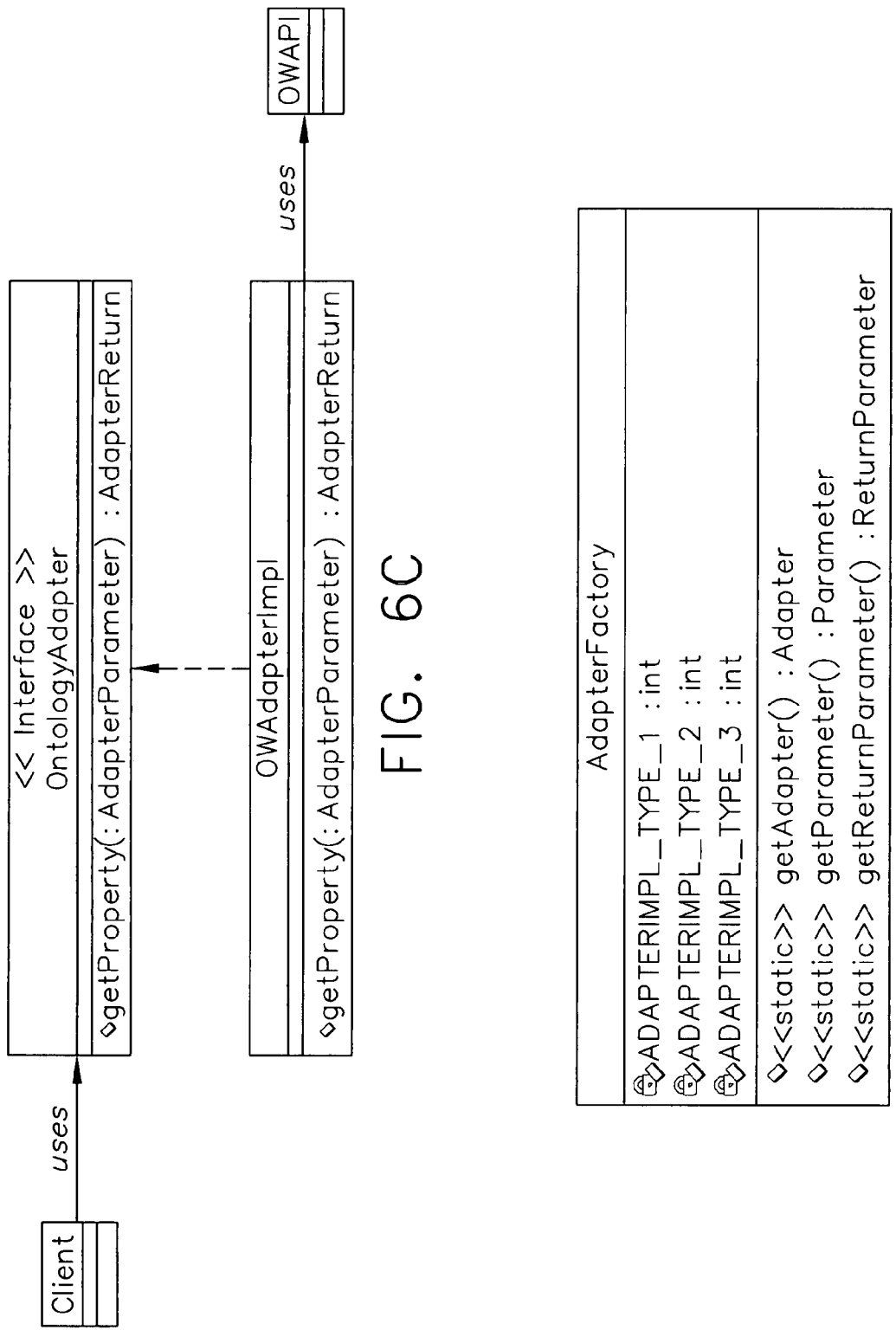

QUERYING OF DISTRIBUTED DATABASES USING NEUTRAL ONTOLOGY MODEL FOR QUERY FRONT END

CROSS-REFERENCE TO RELATED APPLICATION

This U.S. patent application claims the priority benefit of U.S. Provisional Application No. 60/827,098, filed on Sep. 27, 2006, the entire content of which is hereby incorporated by reference.

TECHNICAL FIELD

This invention generally relates to querying distributed databases on a network, and particularly to using a neutral ontology model of a query front end for enabling a user to generate queries to any of the distributed databases through a common semantic interface.

BACKGROUND

The nature of a product support infrastructure typically requires those who support complex systems, particularly in highly distributed environments, to have ready access to design, maintenance, supply point, and other logistics support information sources. The heterogeneous nature of these sources may pose unique challenges having to do with access, accuracy, semantic understanding, completeness, and correlation of performance and maintenance information with relevant resources. The state of current technology is such that the physical constraints having to do with access are easing, but consistent answers to the questions involving content understanding and integration have not yet been found—especially in the area of maintenance and supply chain data source integration. Therefore, there remains a need in the art to address the problems associated with product support in a highly distributed environment.

SUMMARY OF INVENTION

In accordance with an embodiment of the present invention, a method (and related system) for enabling queries for data from any of a plurality of different databases on a network comprises:

constructing a neutral ontology model of a query front end characterized by ontology schemata which subsume the plurality of different databases on the network in order to provide a common semantic interface for use in generating queries for data from any of the different databases;

importing respective database metadata representing logical and physical structures of each database subscribed for receiving queries for data from the query front end;

constructing mappings of the database metadata representing the logical and physical structures of each subscribed database to the ontology schemata of the query front end; and storing the constructed mappings for use by the query front end for queries through the common semantic interface of the neutral ontology model for data from any of the different databases.

An important goal of such methods and systems is to provide "on the fly" access for querying distributed databases on a network through a common semantic interface that enables users to query those data systems without knowledge of data system operational details, standard query language (SQL), or even the terminology used in those data systems. The approach taken is referred to as a "mediated" approach to information integration wherein a neutral ontology model is constructed to serve as a conceptual representation of the information domain and is used as a broker to resolve the heterogeneity of data structures in the data systems.

Database metadata are imported from subscribed databases in order to provide a logical and physical representation of the data system's content. These logical and physical representation elements are mapped to lexical schemata derived for the neutral ontological model in order to "mediate" queries for data through a common semantic interface. The mediated query approach utilizes conceptual representations of data, data content and standardized queries as well as standardized interfaces and protocols for requests and responses of data elements to support client information requirements, creating a generalized, standard framework for providing heterogeneous information access and integration services.

In described embodiments of the mediated query approach, two complementary architectural components are employed: (1) a flexible metadata architecture that realizes the underlying conceptual elements of mediated information integration: the neutral ontology model, logical and physical system model structures, and metadata mapping technology; (2) and a system architecture for a run time web service-based implementation that supports a scalable approach to mediated information integration.

An embodiment of a related system for querying distributed database on a network is preferably implemented as a Web Service that allows integration into net-centric (XML-based) information architectures. The preferred, XML-based distributed data collection system utilizes available COTS components for core capabilities by encapsulating them in COTS adapters that interface between the system and the standard APIs used by the COTS components. The COTS adapters utilize a novel "parameter passing" method to enable any usable COTS component to be adapted and interfaced to the system. This approach provides plug-and-play capability to mitigate risk and allow for interchangeability of the COTS components should technical or business needs dictate such a course of action. It supports migration or upgrade of the COTS components as the state of the art advances while mitigating the inherent risk associated with usage of third-party software.

Other objects, features, and advantages of the various embodiments of the present invention will be explained in the following detailed description with reference to the appended drawings.

BRIEF DESCRIPTION OF DRAWINGS

FIG. 3A is a diagram illustrating steps of a preferred ontology creation process for constructing a domain ontology for querying databases to be subscribed to the system.

FIG. 3B is a diagram illustrating steps of a preferred mapping process for mapping logical and physical structures of the subscribed databases to the domain ontology.

FIG. 6C illustrates an example of an adapter for the Ontology Model after customization for its specific usages.

FIG. 6D illustrates a factory pattern for assembly of modular components for "parameter passing".

DETAILED DESCRIPTION

Figure 1:
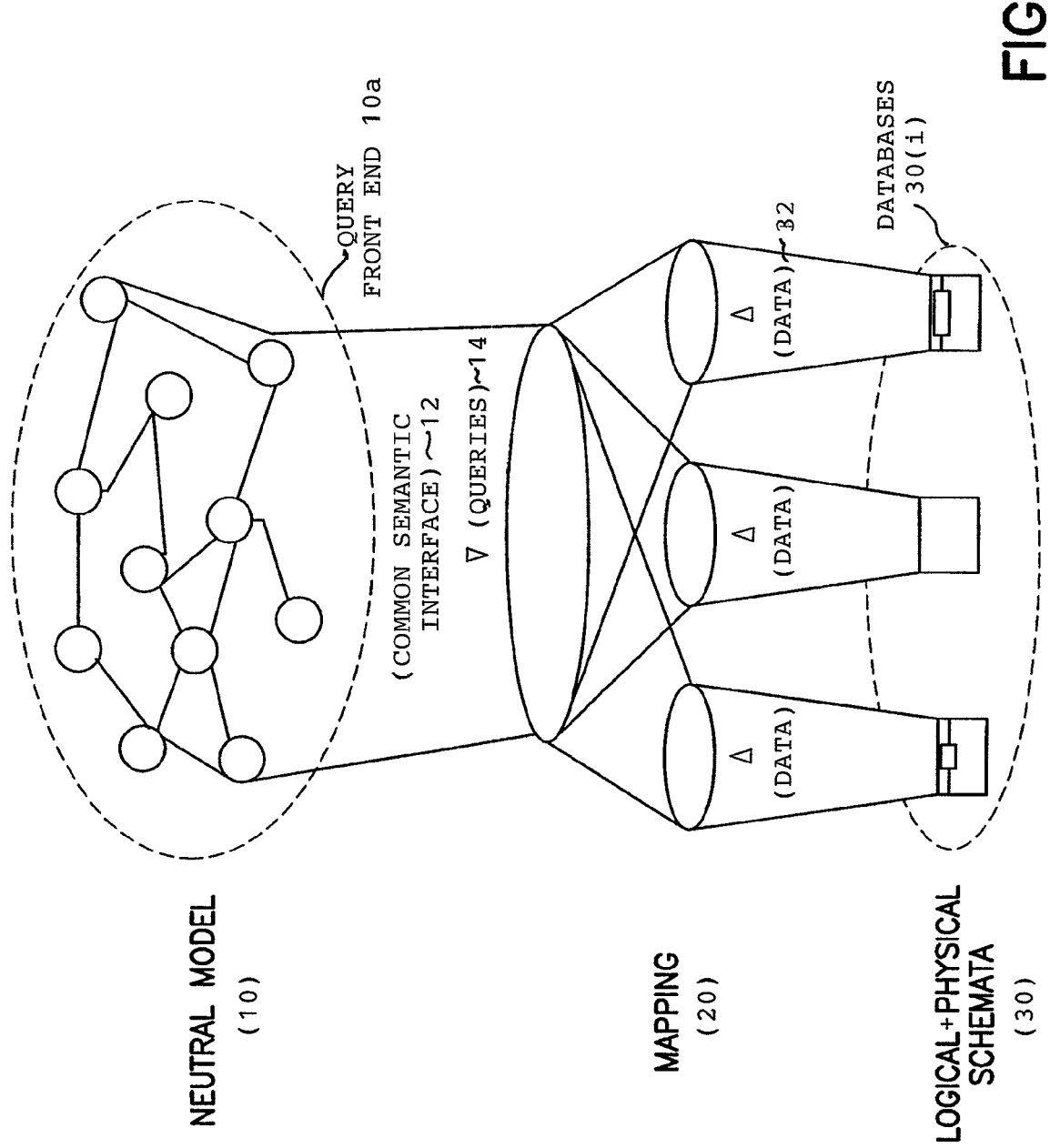
FIG. 1 is a diagram illustrating an overall conceptual architecture for a method (and associated system) for querying distributed databases using a semantically neutral query front end in accordance with an embodiment of the present invention.

In the following detailed description, certain preferred embodiments are described as illustrations of the invention in a specific application, network, or computer environment in order to provide a thorough understanding of the present invention. Those methods, procedures, components, or functions which are commonly known to persons of ordinary skill in the field of the invention are not described in detail as not to unnecessarily obscure a concise description of the present invention. Certain specific embodiments or examples are given for purposes of illustration only, and it will be recognized by one skilled in the art that the present invention may be practiced in other analogous applications or environments and/or with other analogous or equivalent variations of the illustrative embodiments.

Some portions of the detailed description which follows are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system, which may be one of any type having suitable computing resources. Aspects of the present invention are also discussed with respect to an Internet system including electronic devices and servers coupled together within the Internet platform, but it may be similarly implemented on any other type of extended network system including wireless data or digital phone networks. Although a variety of different computer systems can be used with the present invention, an exemplary computer system is shown and described in the preferred embodiment.

It may be beneficial to provide a single point of access to send queries for data from distributed databases on a network, in order to simplify access to multiple data sources of different types by users or by computerized software applications. However, existing approaches to information integration are deemed inadequate because they either do not address the issues of semantic heterogeneity or are impeded by data sources that are proprietary in design. An enterprise approach to semantic integration of user access to distributed databases is deemed desirable to provide an open, interoperable solution.

Referring to FIG. 1, a method (and associated system) in accordance with an embodiment of the present invention for querying databases on a network uses a semantically neutral, query front end and a flexible metadata architecture for "mediated" information integration. Elements referenced on the right side of the figure refer to system components, elements referenced on the left side refer to process components, and elements (in parentheses) in the center refer to information flow in the system. A query front end 10a employing a neutral ontology model 10 is used to generate queries 14 for data from any of a plurality of databases 30(i) subscribed to the system through a common semantic interface 12. The neutral ontology model 10 is constructed to provide neutral lexical constructs of a domain ontology that subsumes the semantics of the different databases 30(i) so as to be independent or "neutral" as to logical or physical representations of data in the databases. The logical and physical schemata 30 of the respective databases 30(i) are imported into the system, and mappings 20 are defined between the database schemata and the lexical constructs of the neutral ontology model 10. The mappings are stored in a repository and used by the query front end with the domain ontology constructs to provide the common semantic interface 12 that enables a user to send queries 14 to any database subscribed to the system and receive data 32 returned from the queried databases. Each of the primary layers of system architecture is described in detail below. In a preferred system, the system architecture is implemented as a Web Service that allows integration into net-centric information architectures.

Neutral Ontology Model

The neutral ontology model, or the domain ontology, is used to subsume the semantics of different databases to be subscribed to the system but is otherwise independent or "neutral" as to their logical or physical data representations. The neutral ontology model can be accessed by both users and client software components to capture and clarify domain semantics. From end users' or application developers' perspectives, the common semantic interface provided by the neutral ontology model attains the goal of enabling a single information resource across multiple data sources within a specified domain. Users may have no idea of the diversity of the underlying data sources, nor be aware that the data is physically distributed over the network. Their view of metadata is merely that of a semantic catalog of available information—how data is organized logically or physically is usually of far less interest than how the available information is semantically described.

Use of a neutral ontology model to abstract and encapsulate (or mediate) multiple data sources serves to conceal the complexity of individual data elements and provides a more "user-centric" approach to the accessing of data from heterogeneous systems. Users are relieved of the need to know where data is located—responsibility for location and identification of correct and relevant data elements is transferred to the mediation system. This provides a significant advantage, for example, in a customer service system, in which obtaining, integrating, and effectively applying customer support data is probably the key impediment to effective handling of product support issues. In the system, users do not need to know the structural details of the various data sources. Again the responsibility is transferred to the mediated system query formulation process based on knowledge of physical system particulars.

With structured information, there is typically a direct mapping between concepts and terms (a database symbol generally denotes a concept to the experienced user). However, the terms that users utilize and those employed by an information system may have no commonality even when they denote the "same" concept. This is significant, as the objects of communication (terms) no longer denote the objects of interest (concepts) unambiguously. What a product engineer might call a "system fault" may be known as an "inherent failure" in another maintenance data system and/or must be referenced by a cryptic code in another. Semantic issues of this nature can be perplexing for humans and make creation of automated data analysis tools an extremely arduous task. A mediated approach to integration of heterogeneous systems addresses this difficulty.

A neutral ontology model is essentially an information model of the domain of interest. The ability to readily translate the derived domain ontology into a deductive database (DDB) as the metadata repository drove the decision to represent our domain ontology in First Order Logic (FOL) rather than other more popular but less capable alternatives.

The process of building a neutral ontology model is an exercise in careful and exhaustive enumeration of all domain concepts thought to be important by a panel of domain experts and capturing the relationships between them along with any constraints on them. Besides integration with other metadata elements, the choice of FOL as a representation language allows for the metadata repository's inference engine to perform consistency checking when new model facts are added to the model or new mapping predicates are added to the repository.

Logical/Physical Schemata: Database System Metadata

Database system metadata describe and correlate the logical and physical schema of each individual database system. In order to subscribe a database to the system, considerable effort must be put into understanding its physical and logical design and a keen understanding of the individual data elements. It is prudent to take advantage of metadata that already exists in member systems to minimize redevelopment costs and ensure consistency. The metadata most likely to be available are physical models (usually available), logical models (less likely), and data dictionaries (even less likely, although less formal glossaries are sometimes available or can be gleaned from design documentation).

Physical Models—The physical model identifies the layout of the data, a prerequisite to find and access data. Although one can draw significant knowledge from the physical model, accurate understanding of the data elements themselves must also be acquired. The terms used to label information tend to be cryptic and inconsistently applied (if at all), relationships in the data structure are difficult to recognize directly, and no descriptive information is generally available for reference and precise interpretation. A physical model provides the means to traverse those relationships supported by the physical design and supplies a measure of insight on the components such as a database management system (DBMS), extensible mark-up language (XML) structure, tables, fields, etc.

Logical Models—The logical model identifies conceptual relationships within the data. A logical model is used to explicitly identify those relationships without regard to the optimizations that are incorporated in a physical model. A logical model will typically provide a naming structure that is more useful in understanding the data relationships within a subscribed system. These relationships, whether explicit or derived, are a source of metadata needed for semantic understanding of the data. Within the virtual data access approach, the logical model is used as an essential source of interpretation for logical data structure and determining semantic interpretation of the data content, and therefore ultimately is the key element in bridging the gap between the neutral ontology model and the physical data.

Data Dictionaries—A data dictionary provides a textual description of the data elements defined within a model. It is the primary source for explicit semantic interpretation of the data within a subscribing system. The data dictionary is not a semantic model per se, but it does provide crucial understanding of the data content from a semantic perspective. In conjunction with the supporting model, it is used heavily to ensure proper interpretation of data content and correlation of the mappings to the neutral ontology model during the mapping process. Dictionaries are typically not provided and in most cases must be derived from whatever sources are available: glossaries, other design documentation, system experts (either administrators or users), etc.

Mapping of Database Metadata to Neutral Ontology Model

Creation of appropriate mappings are arguably the most critical and challenging element of the mediated approach. Resolution of heterogeneity has always been a major challenge for any information integration effort. The virtual or "on-the-fly" mediated data access approach resolves all types of heterogeneities dynamically when processing queries, and therefore does not require a pre-conversion of data from member systems to the semantic model; however, the dynamic mappings used for real time mediated access are generally more time-consuming due to derivations being performed each time a query is processed.

Mappings are correlations between any two (or more) models, but in general bridge some portion of the conceptual gap between the physical model and the neutral ontology model. Since the neutral ontology model is not a model supplied by a subscribing system, the mappings between subscribing systems and the neutral ontology model must be developed. There is little in the way of formal methodologies for identifying, developing and managing mappings, yet it is critical to the operation of a mediated information integration system. Mappings generally associate metadata elements at different levels of abstraction, such as:

1. Mapping between ontology and lower level schemata (e.g. a logical/physical relational schema);
2. Mappings between ontological queries and lower level queries; and
3. Mappings between local security policies and global security policies. In the described implementation, the mappings provide direction to the query processor, which uses such information to evaluate and optimize ontological queries against member systems efficiently and effectively.

The mediated query approach seeks to integrate a number of member data systems, each of which has its own logical/physical schema. These schemata from multiple member systems may or may not share common naming standards across their schemata, however, they do share common semantics as expressed in the neutral ontology model. Mappings between the neutral ontology model and lower level schemata connect each lower level schematic element with one or more corresponding concepts in the neutral ontology model. They are constructed based on semantic equivalence. The semantic equivalence does not mean 'absolute equity' only, but can also represent 'approximate equivalence,' in which case a conversion method will be attached to the mappings for data transformation.

Recalling that the goal of a mediated information integration system is to access data from multiple heterogeneous data systems using a single ontological view of the data, the mediation system's query engine must have the ability to translate queries and transform query results from one format to another between ontological and physical layers. To achieve this, the query engine must be able to reconcile the differences in query capability among member systems, because member systems are likely to deploy different data models and use different query languages. Some data sources, for example unstructured data sources such as plain text files, online documents, and email systems, do not have a query facility at all, or have a very limited query mechanism, such as a keyword-based search engine. Even for a standard query language such as SQL, dissimilarities can be found among various commercial products, especially for advanced operations such as join capability and function processing. Thus, the mappings between an ontological query and a lower level data system query must provide the information required by the query engine by characterizing and mapping member system query capabilities so that the engine will be able to apply appropriate translation rules when needed.

Semantic Integration

The mediated query approach represents database semantics using an ontological model, which acts as a conceptual query interface to the system. This approach abstracts the details of information representation away from users, allowing them to query against the concepts the data represents, freeing users from having to have intimate knowledge of each data source, and provides them with a more intuitive means to search for and extract information. An "ontology" can be described as "the specification of a conceptual vocabulary (entities and relations) for representing information—an explicit description of how the world has been conceptually partitioned."

Figure 2:
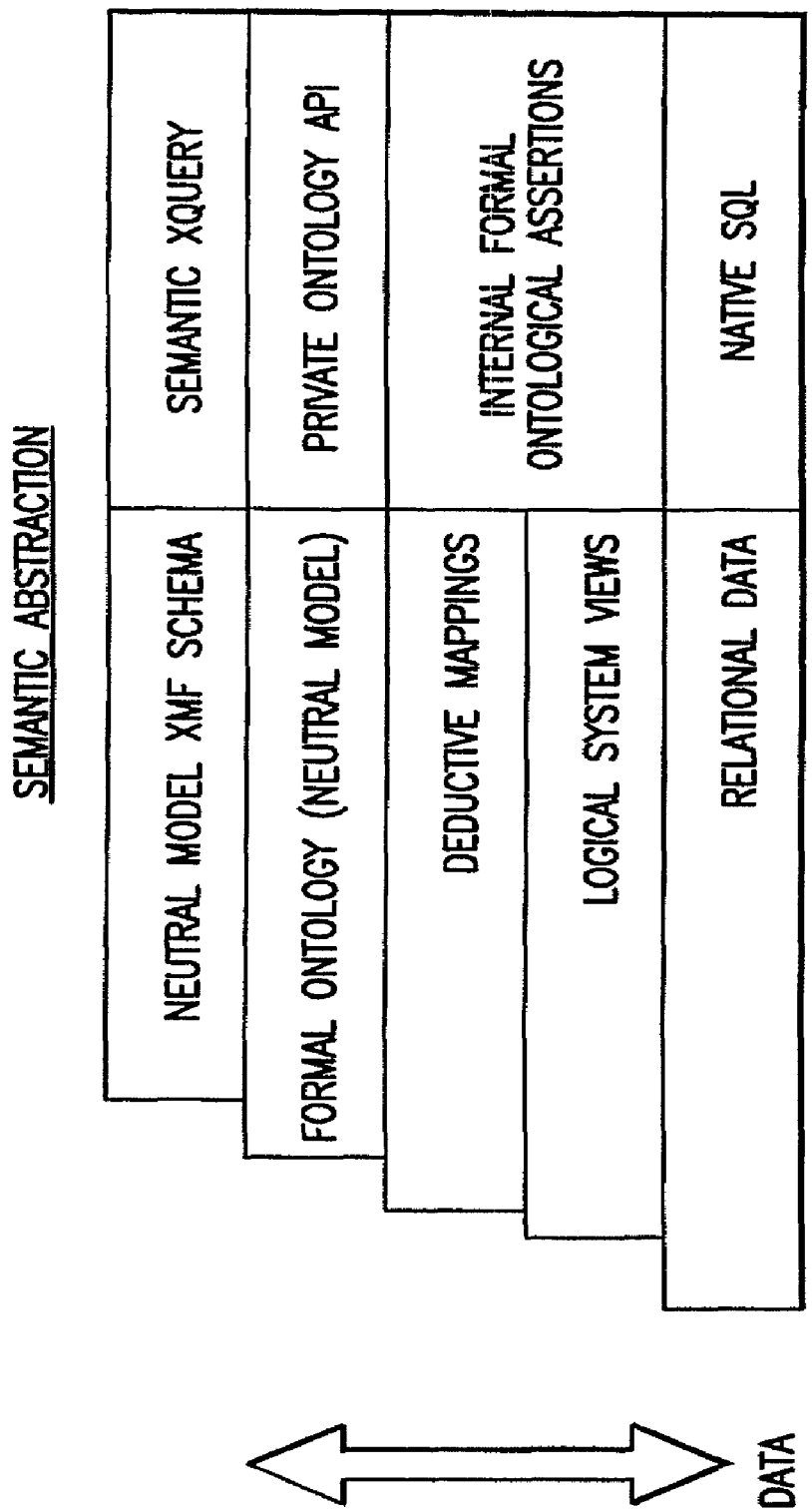
FIG. 2 is a diagram of a system hierarchy of semantic abstractions of database schema to Neutral Model schema.

The continuum between data, information, and semantics, and the logical interconnections and transformations between these entities, is implemented in layers, as illustrated in FIG. 2. The layers on the left hand side of the figure are labeled with their generic or functional names, and the layers on the right hand side are labeled with the specific names in the system implementation. Starting from the bottom, the first layer is the data itself. This is encapsulated in the individual data sources, which exist in disparate systems conforming to native security policies and data formats. SQL is a logical mechanism for accessing this data, assuming it is relational in nature. The next layer upward consists of a set of formal assertions that represent logical system views of the subscribed data sources. These conceptual representations of the data sources are used along with the mappings in the next higher layer to support query generation—they are specific to a particular data source and do not change once created.

Moving further up the stack, deductive mappings use predicate logic to translate concept-based queries into a form that can be interpreted by the data integration engine, and to similarly translate the data system query results back into their conceptual representation. They are specific to and dependent upon the system views, in that they relate concepts at the semantic level to logical representations of system data in the views. The ontology relationships mapped at the semantic level to the database schemata are stored in a Deductive Data Base (DDB) repository used by the query front end, and at run time the ontology rules are combined with a set of controlling logical assertions in a forward chaining manner to infer connections between conceptual query terminology and system data on the fly.

The next layer up in the semantic transform stack is the semantic model itself, or ontology, which is created from an analysis of the semantic properties of the underlying data systems. It is accessed using an API (Application Program Interface) that is native to the underlying Ontology Management System.

Finally, at the top of the stack, the semantic model is presented to users in XML format. Users use this representation to browse for concepts representing the information they desire, and write queries against these concepts and the relationships between them. For example, a chosen semantic adaptation of the neutral ontology model may be used as the query language. For users unfamiliar with XML, or for a more client-friendly approach, a graphical viewer may be used to assist understanding of the semantic model.

Ontology Creation Process

The most important decision in the Ontology Creation Process is deciding what to represent in the ontology. A new approach is taken wherein the initial logical models of the existing data domain (that is, the data required from the data sources of interest) are abstracted and transformed into an ontological form, then fleshed out with the appropriate taxonomic concepts in order to provide a reasonable, economical, and fully mapped ontological view of the customer data domain. As illustrated in FIG. 3A, the process steps (with reference numbers) for the ontology creation process are:

Data Collection (301)—collect the data that will be represented in the data sources, along with corresponding definitions, to provide a basis for the conceptual terminology.

Data Analysis (302)—analyze the data relationships of the conceptual terminology. This analysis should include consideration for addition of any terms "above" the existing hierarchy of terminology that provide helpful semantic/taxonomic categorizations Ontology Development (303)—graphically define the initial ontology and obtain agreement among all interested parties. Once the graphical depiction has consensus, develop the lexical ontology of the domain terminology concepts, conceptual relations, and concept attributes (grounded relations) along with any constraints or axioms required to correctly and formally express the semantic nuances of the domain. The lexical ontology is used for the mapping of neutral ontology schemata to database metadata schemata.

Refinement and Validation (304)—during the development of system mappings, use the ontology to validate the mappings which can in turn be used to validate the ontology in an iterative fashion.

Maturation and System Modification (305)—after deployment, it is anticipated that users will provide usage patterns and system interactions that were unanticipated in the design and development phases. When this occurs the neutral ontology model will be tuned as necessary to maximize system performance and customer ease of use.

Mapping Database Metadata to Ontology Schemata

As illustrated in FIG. 3B, the process steps (with reference numbers) for the process of mapping database metadata to ontology schemata are:

Import Database Schemata from Data Systems (401)—metadata representing the logical and physical structures of the respective databases are imported into the system and stored in a tabular format to facilitate the mapping process.

Import Domain Ontology (402)—the ontology constructs of the domain ontology developed in the Ontology Creation Process (described above) are imported and stored in a tabular format to facilitate the mapping process.

Define Mappings of Database Metadata to Domain Ontology (403)—the mapping definition strategy correlates logical and physical schemata characterizing the subscribed databases to the corresponding ontological constructs or relationships.

Storing Mappings For Use by Query Front End (404)—defined mappings are stored in the DDB repository for use in the Semantic XQuery interface of the query front end.

To facilitate the mapping process, graphical mapping tools are used to help automate some of the tedious processes involved in subscribing a data source into the system. One tool is a Metadata Mapping and Transformation Tool (MMaTT) which is used as an off-line database metadata repository. Another tool is an Online Mapping Management Tool (OMMT) which is used as an on-line mapping tool to create and store logical assertions which describe the relationships between Neutral Model constructs and associated Database modeling elements.

The Model Mapping and Transformation Tool (MMaTT) is an offline metadata repository used to retain data source models (such as the logical and physical models, and data dictionaries, described above) in order to identify, define, and record the correlations between them. The purpose for this tool is to provide a consistent and persistent structure for metadata (models) to overcome structural differences in modeling methodologies/tools, and to record and view model elements, definitions, and correlations between models (mappings) which are generally outside the scope of traditional data modeling methods. This provides a historical model to support traceability of integration representational and mapping decisions when connecting the informational components of a semantic-based integrated information system. The MMaTT's primary utility is in providing a way to help a person performing subscription to analyze and organize their thoughts in preparation for performing the other subscription tasks (creating logical models for query engines, creating or adding to the neutral ontology model, and other cognitive tasks) in preparation for creating the run time mappings. The tool implements a relational model that supports these goals and is essentially DBMS-independent.

There are three components of mapping stored in MMaTT: (1) One or more data source models that are to be mapped to the target neutral ontology model; (2) Mappings correlating data source models to target neutral ontology model along with any qualification that must be applied; and (3) Transformations (changes to the source data content that must be performed in order for the mapping to be accurately represented by the target neutral ontology model). The process of storing the models and mappings within MMaTT strips away graphical representations of the models (the model syntax), retaining only the intent of the model components or concepts (the model semantics). The mappings may be recorded in a highly structured manner with the intent to automate processing of the mappings, or less structured manner to support easier user interpretation.

Figure 4A:
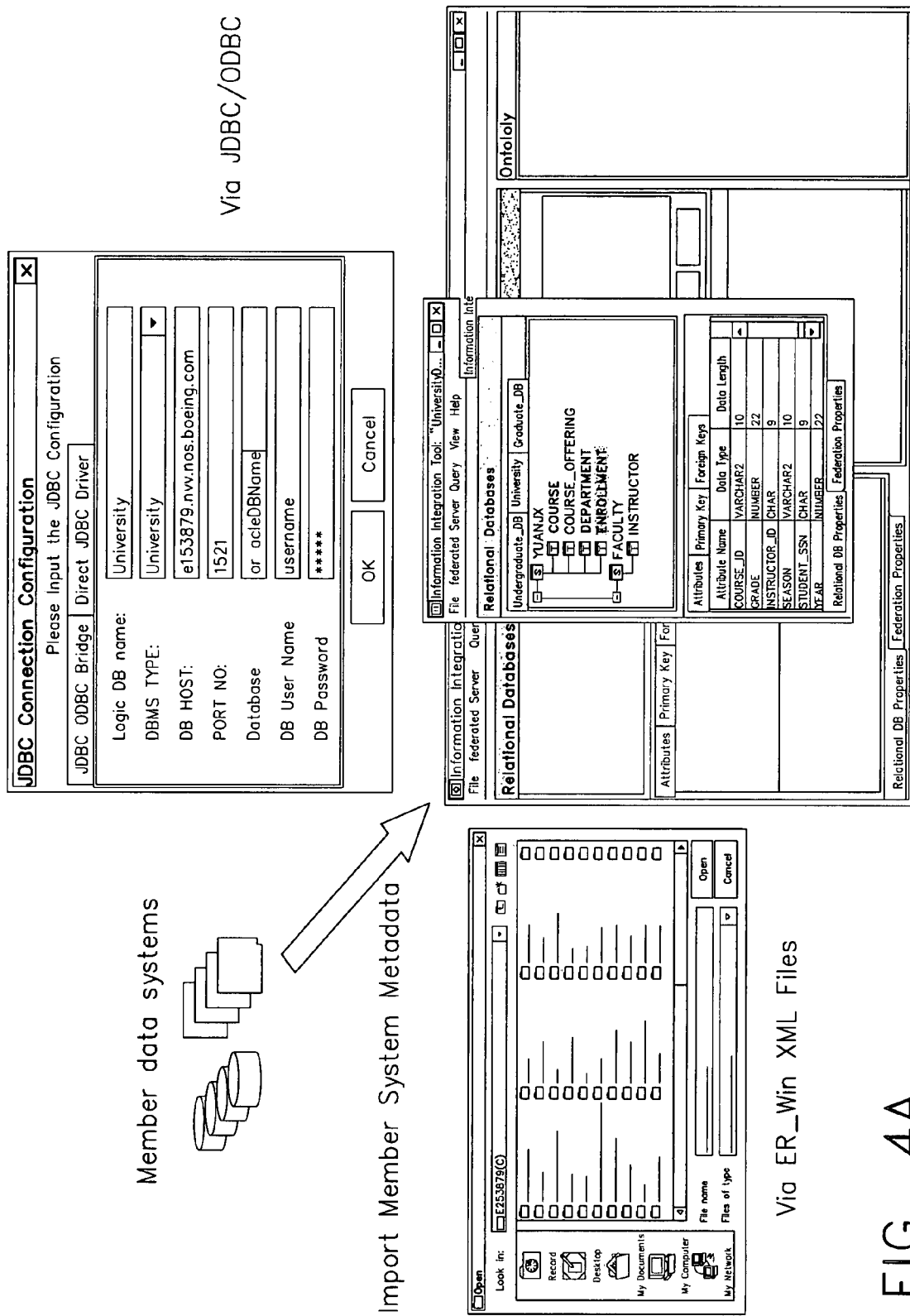
FIG. 4A is a diagram illustrating a mapping tool for extracting database metadata information.
Figure 4B:
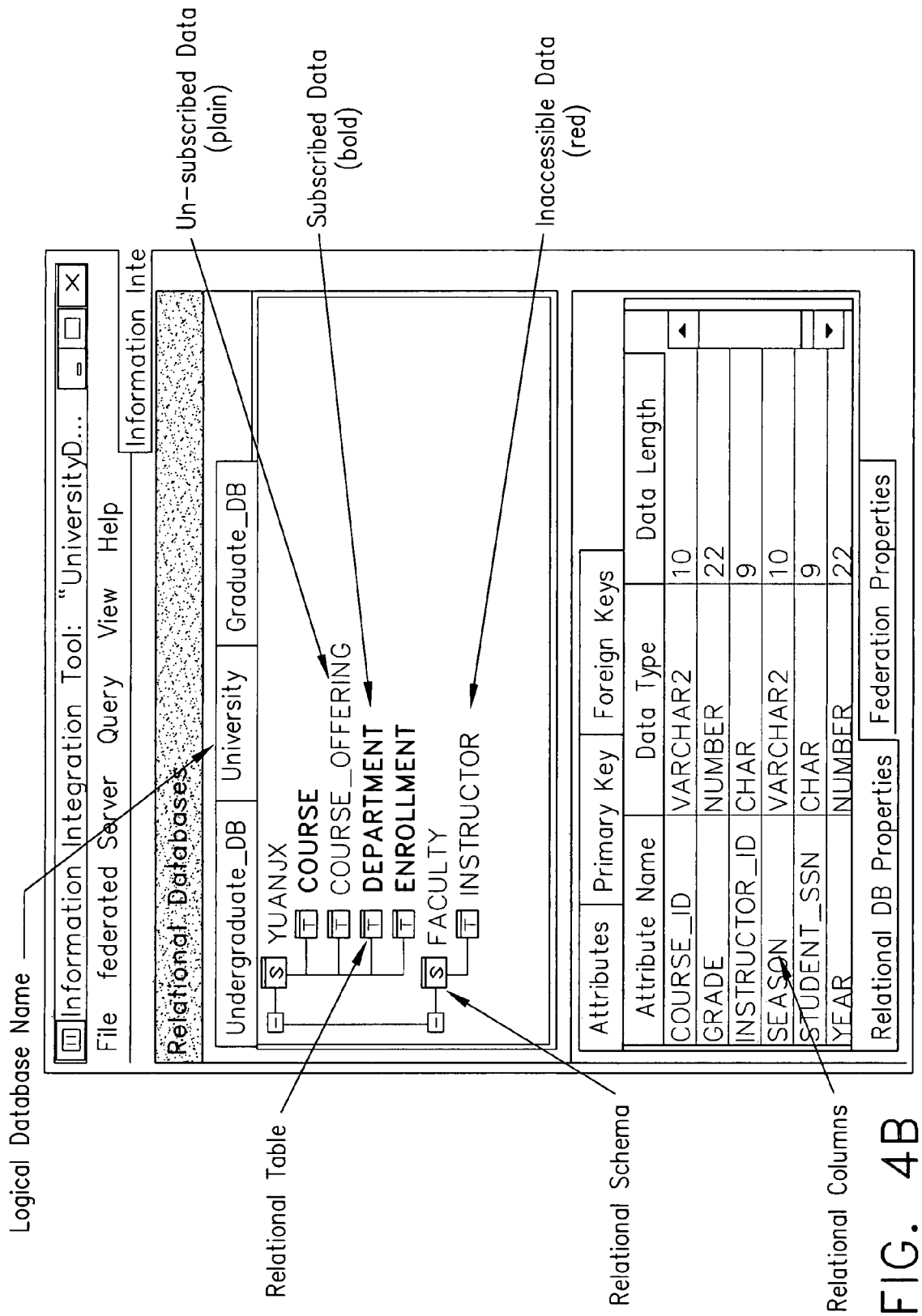
FIG. 4B is a diagram illustrating a graphical interface for the tool to display database metadata information.

The Online Mapping Management Tool (OMMT) is a software component that provides a graphical approach to simplify various tasks performed in connecting the integration system logical and neutral ontology model with the data source components of a semantic-based integrated information system. It also supplies a data representation (persistence) mechanism. The OMMT performs the following important functions:

1. The OMMT is used to import local metadata information (e.g. database schemata) from existing data systems through standard interfaces such as JDBC/ODBC (Java DataBase Connectivity, Open DataBase Connectivity) which are used to extract logical and physical structure information from a database through the system's native APIs. The imported metadata information is stored persistently in an ontological format. In the example of a graphical interface for the OMMT tool shown in FIG. 4A, the user only needs to provide some DB accessing parameters, such as the logical DB Name, DBMS type, DB Host location, Port number, and appropriate user authentication information, and all metadata information will be loaded automatically. As illustrated in FIG. 4B, the tool has a graphic user interface (GUI) to illustrate the captured metadata information, not only the schematic structure of a database schema (database, schema, table, and column), but also the subscription status (e.g. unsubscribed, subscribed) and security accessibility (accessible or inaccessible), which are important in regards to information integration among multiple heterogeneous data sources.

Figure 4C:
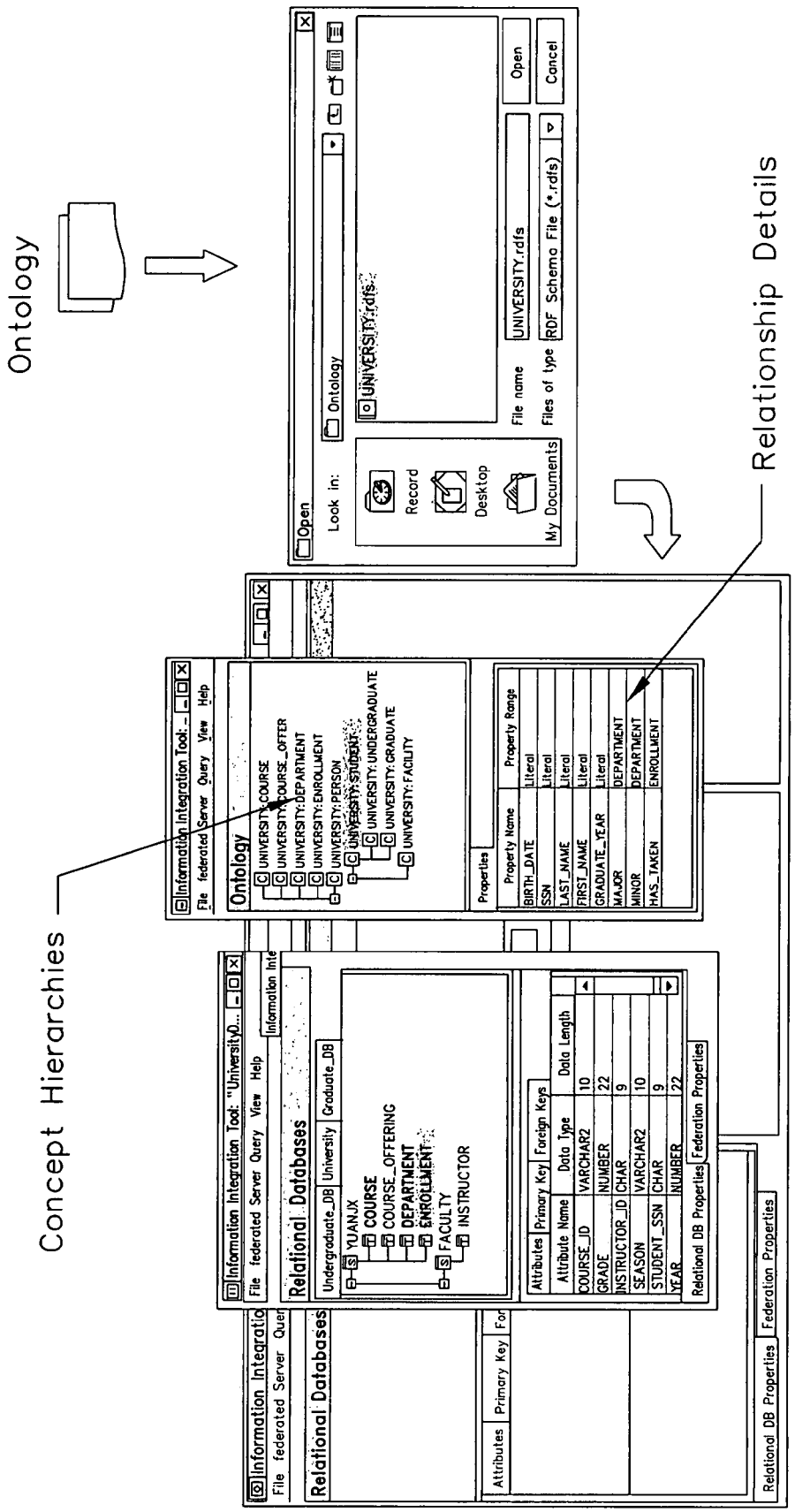
FIG. 4C is a diagram illustrating use of the mapping tool for loading in the created domain ontology with details such as concept hierarchies and relationship details.

2. The OMMT tool is also used to import the domain ontology that is developed in the Ontology Creation Process (described above). For example, as shown in FIG. 4C, the created domain ontology (neutral ontology model) is loaded into the tool with a graphic presentation of details such as concept hierarchies and relationship details.

Figure 4D:
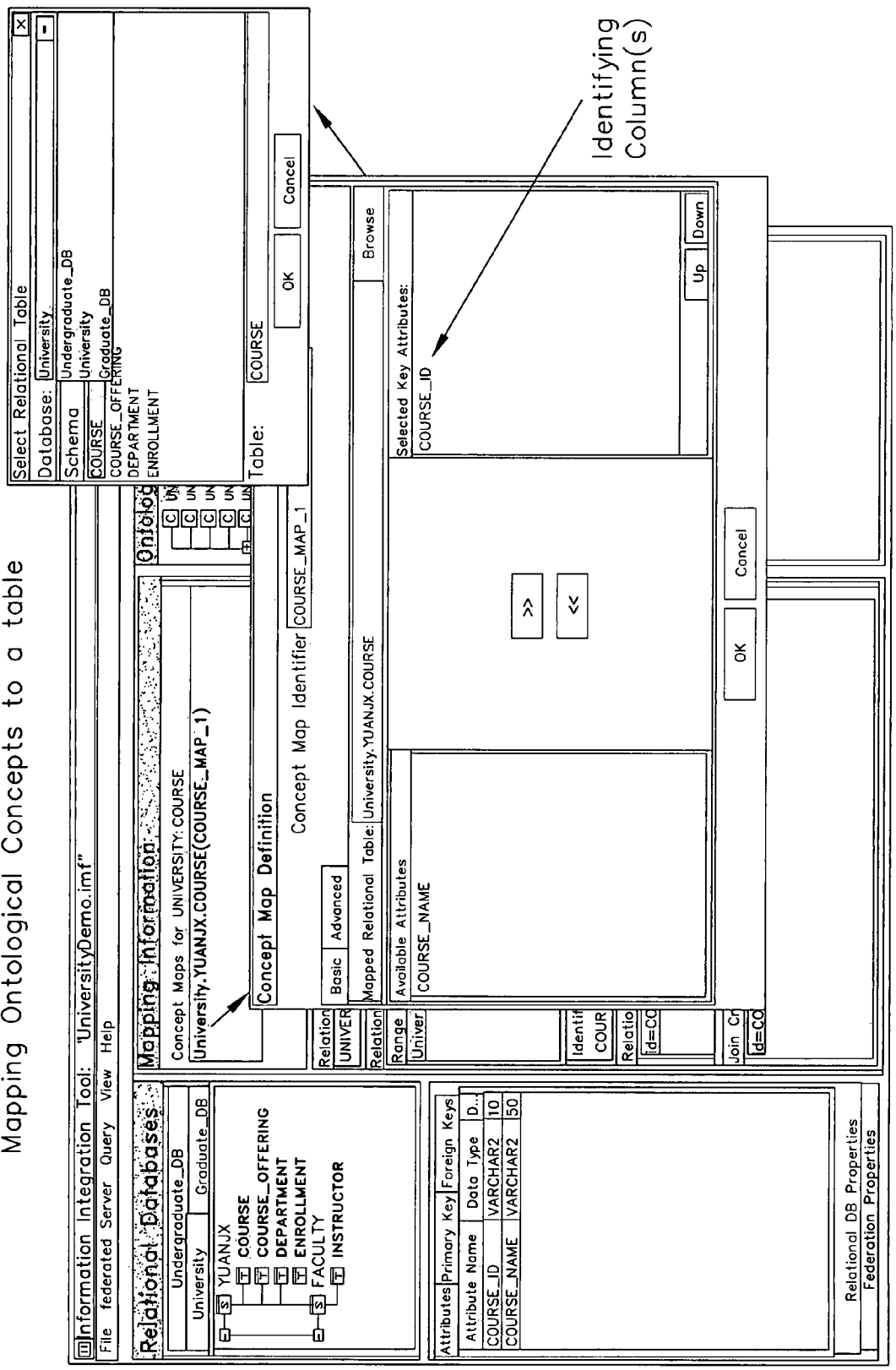
FIG. 4D illustrates the mapping of ontological concepts to a database table.
Figure 4E:
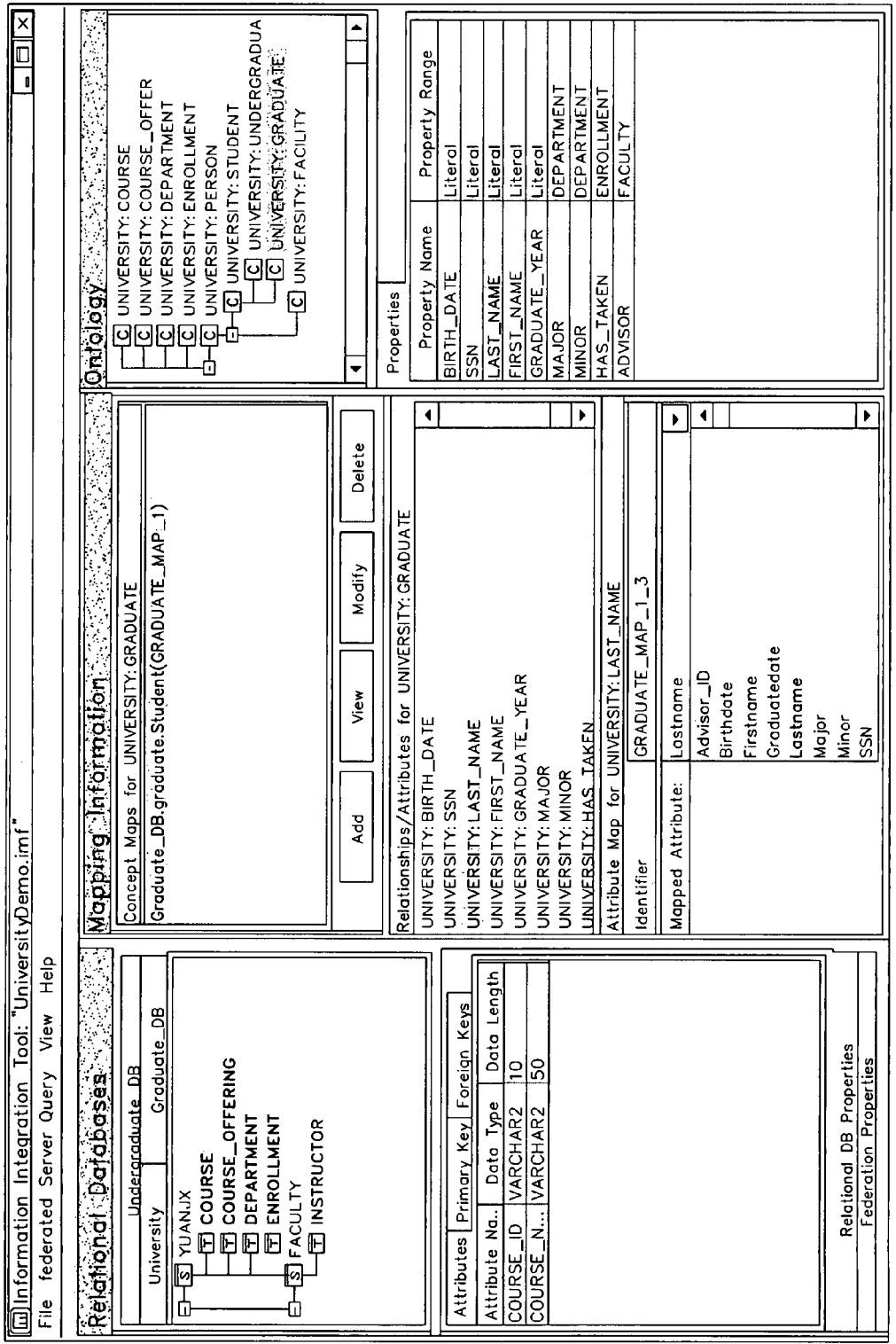
FIG. 4E illustrates the mapping of ontological relationships to a database column.

3. The OMMT provides a graphical means for users to define mappings between local database metadata and the domain ontology. Identifying, developing, and managing mappings between these components are critical to the operation of an integrated information system. Pieces of data from different sources need to be integrated mainly because they do share common semantics. The common semantics here does not only mean 'absolute equity', but also refers to 'approximate equivalence'. The mapping strategy correlates multiple local schematic elements, for example tables and columns, by mapping them onto the same ontological concepts or relationships. FIG. 4D illustrates the mapping of ontological concepts to a database table, and FIG. 4E illustrates the mapping of ontological relationships to a database column.

Figure 4F:
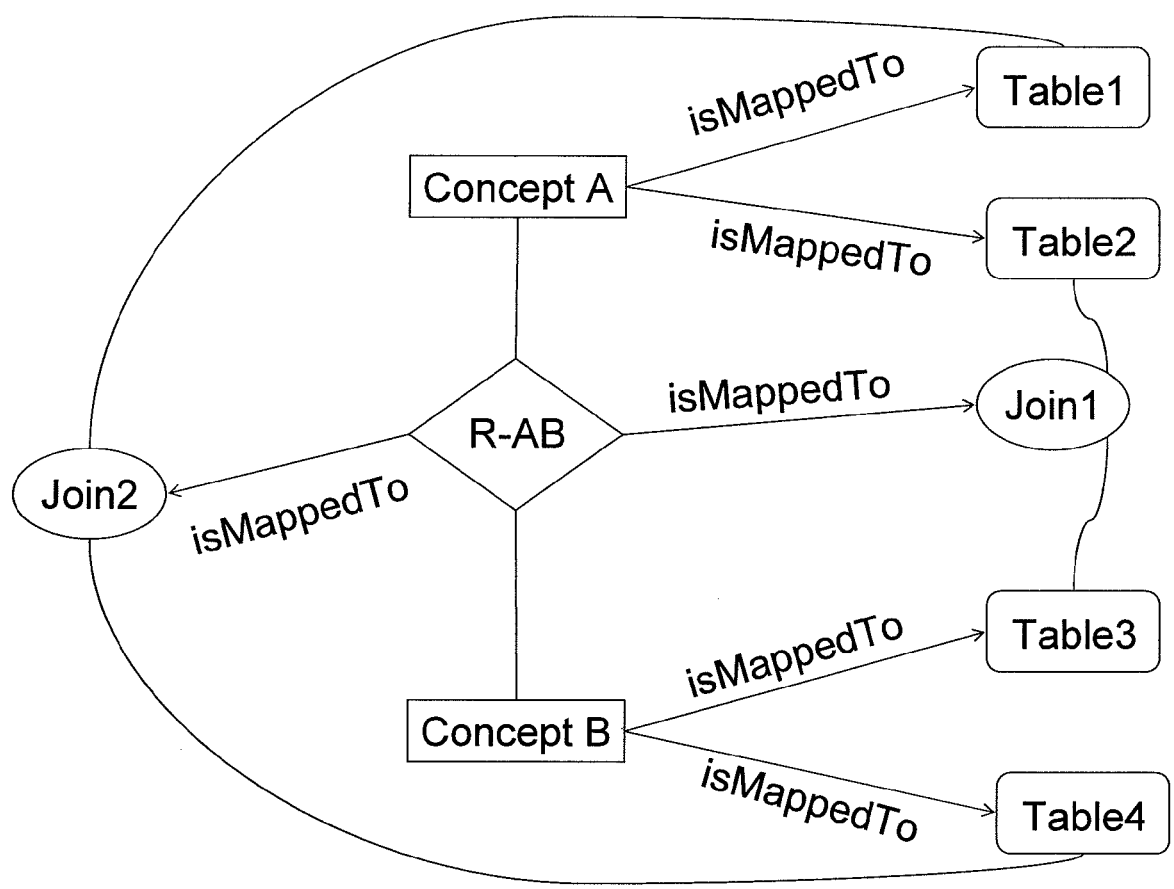
FIG. 4F illustrates a simple example of mapping database metadata schemata to semantic constructs of the ontology model.
Figure 4G:
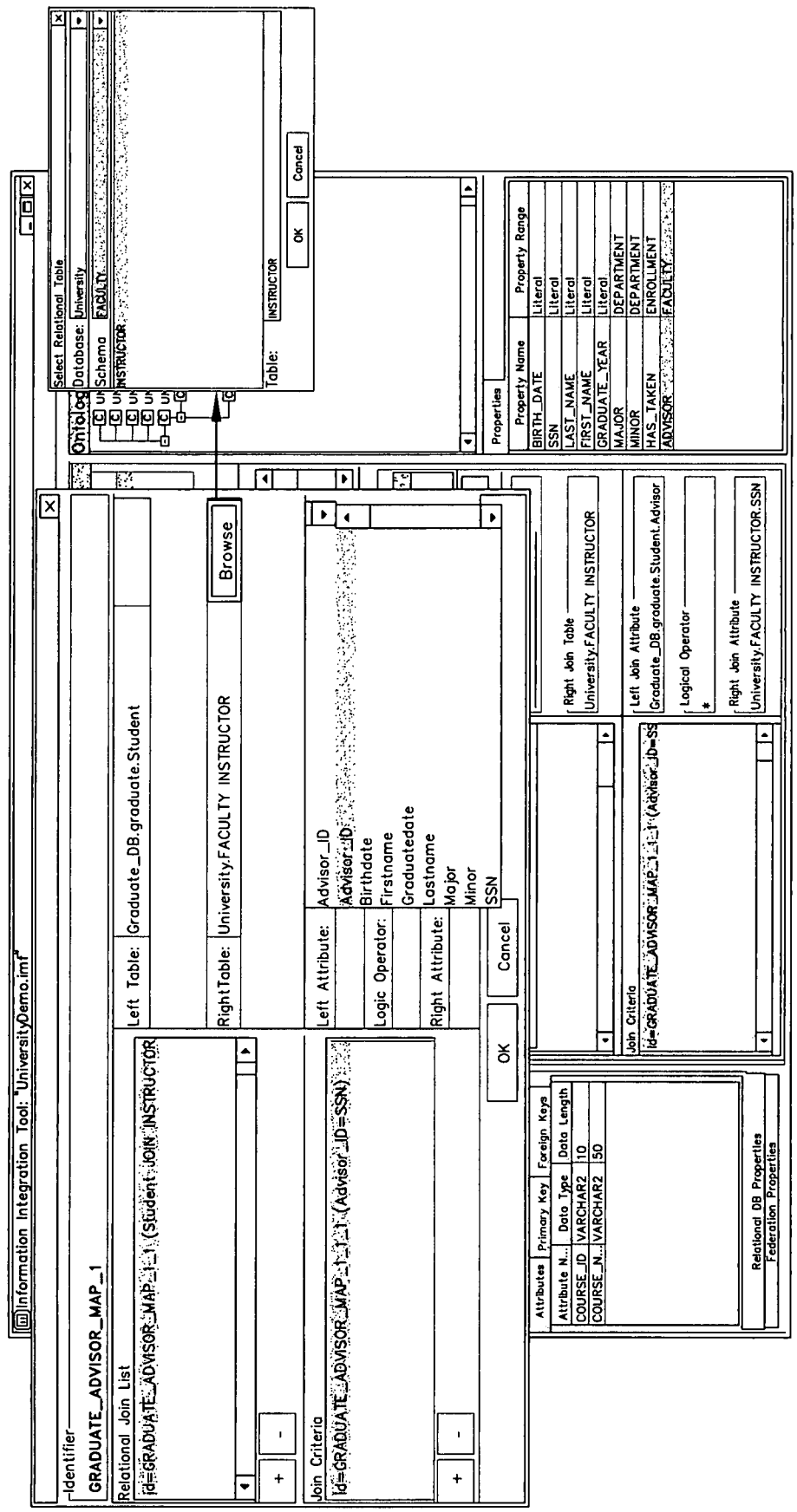
FIG. 4G illustrates use of the mapping tool to define the mapping between an observed ontological Relationship and Database constructs.

With the use of the MMaTT and OMMT tools, the database metadata schemata are thus mapped to the semantic constructs of the ontology model. In FIG. 4F, an example of this initial mapping is represented graphically as a simple illustration. As shown in the figure, Ontology ConceptA is mapped to Table1 and Table2 of a Database, while Ontology ConceptB is mapped to Table3 and Table4. The Relationship R-AB is mapped to two join operations, i.e., Join1 and Join2 respectively. Join1 is between Table2 and Table3, while Join2 is between Table1 and Table4. In FIG. 4G, an example is shown in which the user can use the OMMT interface to define the mapping between the observed ontological Relationship and Database join operations. The semantic navigation operation, one of the major semantic query operations, can thus be evaluated by performing a relational join operation. The mapping does not pre-define a fixed type of join operation for any semantic navigation. Instead, an appropriate join type can be chosen during runtime. The Online Mapping Management Tool persistently stores all extracted semantics from the mapping process, then converts the ontological representations for database metadata from tabular form into ontology metadata format for export to the DDB repository used by the query front end.

A semantic request interface, referred to herein as Semantic XQuery, uses the ontology metadata stored in the DDB repository to generate queries for data from databases subscribed to the system in order to provide the common semantic interface of the query front end. A detailed description of the Semantic XQuery formalism is provided in commonly-owned, co-pending U.S. patent application Ser. No. 11/186,253, filed on Jul. 21, 2005, entitled "Method and Apparatus for Generic Semantic Access to Information Systems", which is incorporated herein by reference. The Semantic XQuery function translates user-defined semantic queries in high-level semantic terminology into low (database) level queries, and transforms the retrieved low level data answers into instantiations of the domain ontology.

Run Time Web Service Implementation

Figure 5A:
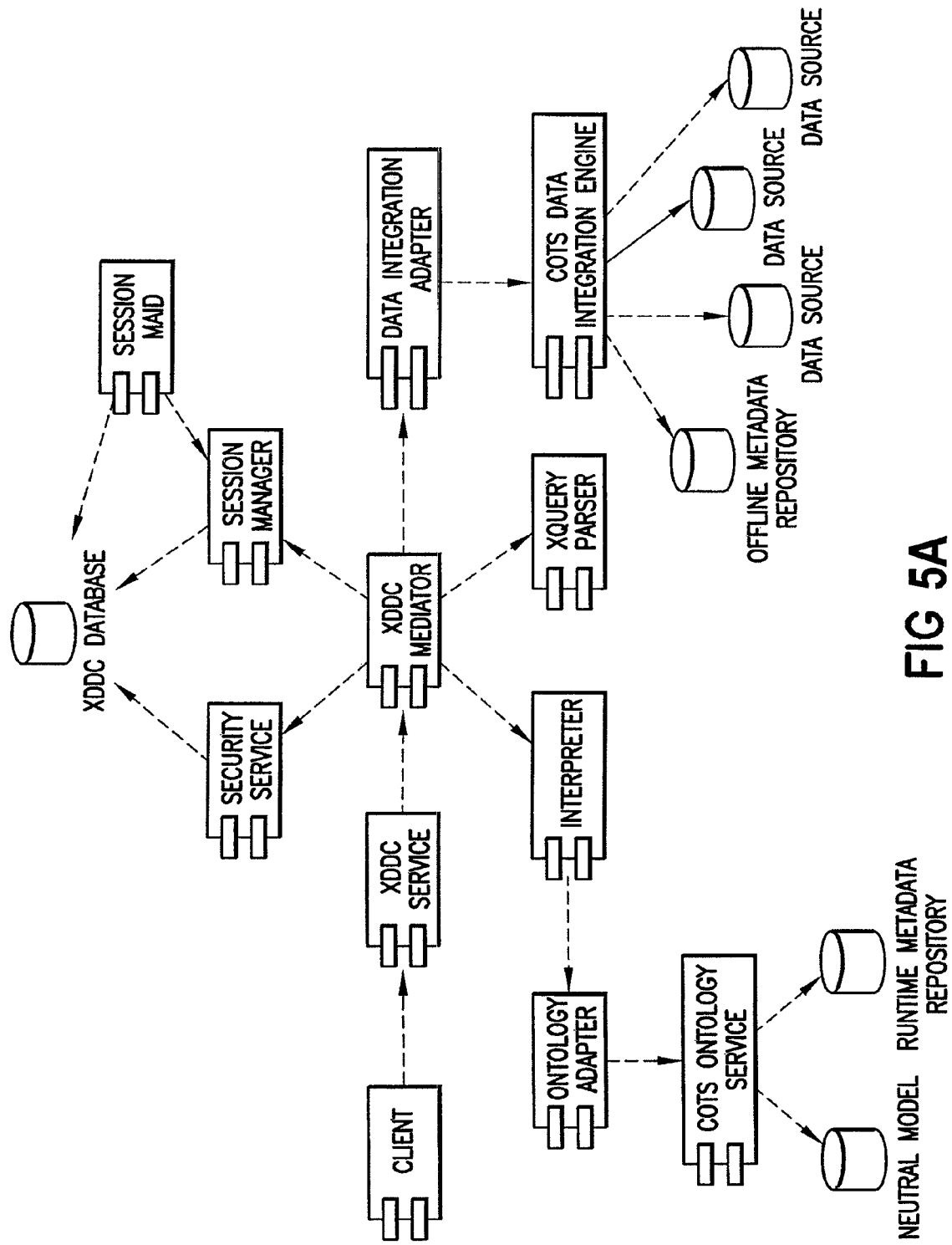
FIG. 5A is a top-level diagram of an architecture for a preferred embodiment of a related system for querying distributed databases on a network implemented as a Web Service.

In a preferred embodiment, the mediated query system is implemented as a Web Service architecture consisting of a collection of software components that interact to implement the necessary runtime connectivity, authentication, session management, and query support of metadata and consumer data access and retrieval. A top-level architecture is shown in FIG. 5A. The system is referred to therein as the "XML Distributed Data Collection" (XDDC) system, and the primary components of its architecture are the XDDC Web Service, Mediator, Session Manager, Security Service, and Data Integrator. Each of these components is discussed in more detail below.

Architecture

The XDDC runtime architecture is an adaptation of the "model-view-controller" (MVC) pattern. MVC was originally developed for use in graphic user interfaces. Over time its role has expanded, and it is now commonly used in modern client-server applications. The basic idea behind MVC is straightforward: the "model" is the data, the "view" represents the data to the user, and the "controller" embodies the logic and functionality necessary to connect the two. By developing each of these conceptual components separately, loose coupling between layers is achieved, resulting in a flexible and adaptable implementation. Changes can be made to any one component without affecting another.

Model—In XDDC, the model consists of the integrated data sources and the integration engine encapsulating them. This includes the static views contained within the integration engine that act as the first layer of abstraction above the raw data itself. Unlike many traditional client-server applications, the model in the XDDC system is a dynamic object that can change in a multitude of ways as data systems are subscribed and unsubscribed. By loosely coupling the model to the rest of the application via the MVC approach, the system is able to adapt more easily when the model changes.

View—The view consists of XML representations of the query interface and query result data. The semantic model is a semantic abstraction of the data and information contained within the system, and serves as a query interface specification. It describes the concepts that can be queried against and the relationships between them, which is essentially all the information needed to query the system. By representing the semantic model using XML, it can be distributed in a standard format, consumable by various disparate clients. Query results and internal system data are also represented using XML, providing a standard way to process the data.

Controller—The controller, with all of its associated logic and functionality, is implemented as a Java J2EE application. Session and Entity EJBs (Enterprise Java Beans) are used to manage database transactions, and a third-party SOAP engine provides the necessary web services support. The core of the controller is the mediator, which contains all of the logic necessary to choreograph the interactions between internal subsystems. The major subsystems preferably perform one or more of the following tasks:

1. authentication/authorization;
2. query parsing, syntax checks, and semantic validity checks;
3. query interpretation;
4. session management; semantic processing and deductive reasoning; and
5. data integration.

To use the data integration service, a client will typically go through the following steps which represent a typical sequence of events:

1. Authenticate with the data collection web service
2. Retrieve an XML representation of the semantic query interface specification (known as the "Neutral Model", or NM for short) from the web service
3. Write a query (queries are written using Semantic XQuery as described above), and invoke the web service to execute the query asynchronously
4. Poll the service for the query status
5. Retrieve XML query results from the service
6. Log out of the session XDDC Web Service Referring again to FIG. 5A, the XDDC Web Service component is the entry point to the system. It is intended for use by the XDDC Query Builder tool that will enable desktop access to the XDDC system services, as well as by client software applications.

The XDDC web service uses the standardized SOAP communication protocol to implement a distributed interface to the XDDC system. Several key advantages are gained by using a webservice and service-oriented architecture: (a) object-oriented encapsulation is implemented at the network level, allowing webservices to be used and re-used without regard to implementation details; (b) loose coupling is gained by virtue of the distributed nature of the technology; and (c) high level of interoperability is achieved due to the standardized SOAP protocol, and platform/implementation independence.

Mediator

The Mediator component coordinates interactions between system components to process user requests. The XDDC system can be viewed roughly as an implementation of a distributed model-view-controller framework. The Mediator acts as the controller, with responsibilities for managing and coordinating interactions between objects in the system. The Mediator implements rules that determine how components interact to process different types of requests, and decouples data access components from the front-end view. This results in a more cohesive yet loosely coupled system.

Session Manager

The Session Manager component implements user session management strategy that is robust enough to handle the various demands of XDDC system usage scenarios. Distributed applications often have a need to maintain context between inter-component communications. Applications that make use of stateless protocols, like HTTP, have no transport-layer support for such contexts. For example, HTTP in itself provides no mechanism for maintaining state between successive client-server communications. The most common solution to this problem is to maintain state in a data store, which allows communications to be grouped into sessions. Various methods have been employed to implement HTTP sessions, including URL appending and cookies. HTTP sessions are insufficient for XDDC, however, because of special requirements that push them past the limits of their capabilities:

1. Session lifetimes in XDDC can far exceed typical HTTP session lifetimes.
2. XDDC requires significant amounts of data to be persisted in the session. Since Java application servers typically store session data in memory, it is a common requirement that this data be kept to a minimum. The amount of data stored in an XDDC session, multiplied by n users, could bring an app server to its knees.
3. XDDC requires user actions to be recorded historically. This type of archiving is best handled by a proprietary mechanism.

Because of these considerations, XDDC implements its own session management strategy. System memory usage is minimized and semantic query results archiving and general-purpose historical archiving will be provided in the first order functionality.

Many components in the XDDC system need to access persistent data storage. In a J2EE application, like XDDC, distributed objects such as entity EJBs represent persistent data. In some cases entity beans are not appropriate, for instance, access to Oracle sequences does not require the level of transactional support that entity EJBs provide. Use of data access objects allows encapsulation of data access logic for these types of transactions. DAO encapsulation also facilitates easy migration to other data source implementations. By removing data access logic from other components, their behavior is specialized, and complexity is reduced. In addition, code readability and maintainability is improved.

XDDC Internal Security Service

In network systems, security is a major concern. Highly accessible systems are prone to attack, and XDDC is no exception. Standard security implementations normally abide by the rule of the three A's: authentication, authorization (access control), and auditing. For our purposes, authentication is the most important. By requiring users to prove their identity before accessing the system, we provide needed protection to the data and resources that XDDC contains. The XDDC Security component provides authentication services to the XDDC application for validation of acceptable client connectivity. Authorization (in the form of Role Based Access Control) and auditing are functions that may be provided in XDDC development.

Data Integration Engine

The data integration component allows multiple heterogeneous data sources to be integrated behind a common query interface. At the core of this component there exists a COTS data integration engine (described further below), which is configured to perform the fine-grained duties necessary to successfully integrate disparate databases/data sources. We performed an end-to-end demonstration of the new integrated query engine and initial benchmark performance was satisfactory. To further explore the Data Integration Engine authorization and optimization capabilities, a scheme has been developed (in conjunction with our own system authorization function) that passes a user id from the web service down to the Data Integration Engine in order to provide specific authorizations required of certain data systems.

Graphical User Interface

The primary function of the XDDC Query Builder is to provide a graphical user interface for users and system administrators to view a graphical representation of the XDDC ontology (an ontology—or neutral ontology model—viewer). The graphical view allows users to more easily see and understand the structure of the neutral ontology model. Additional capabilities are being developed to help users graphically build queries and view results in a tabular format. The GUI component is provided as a stand alone client of the XDDC Web Service.

Figure 5B:
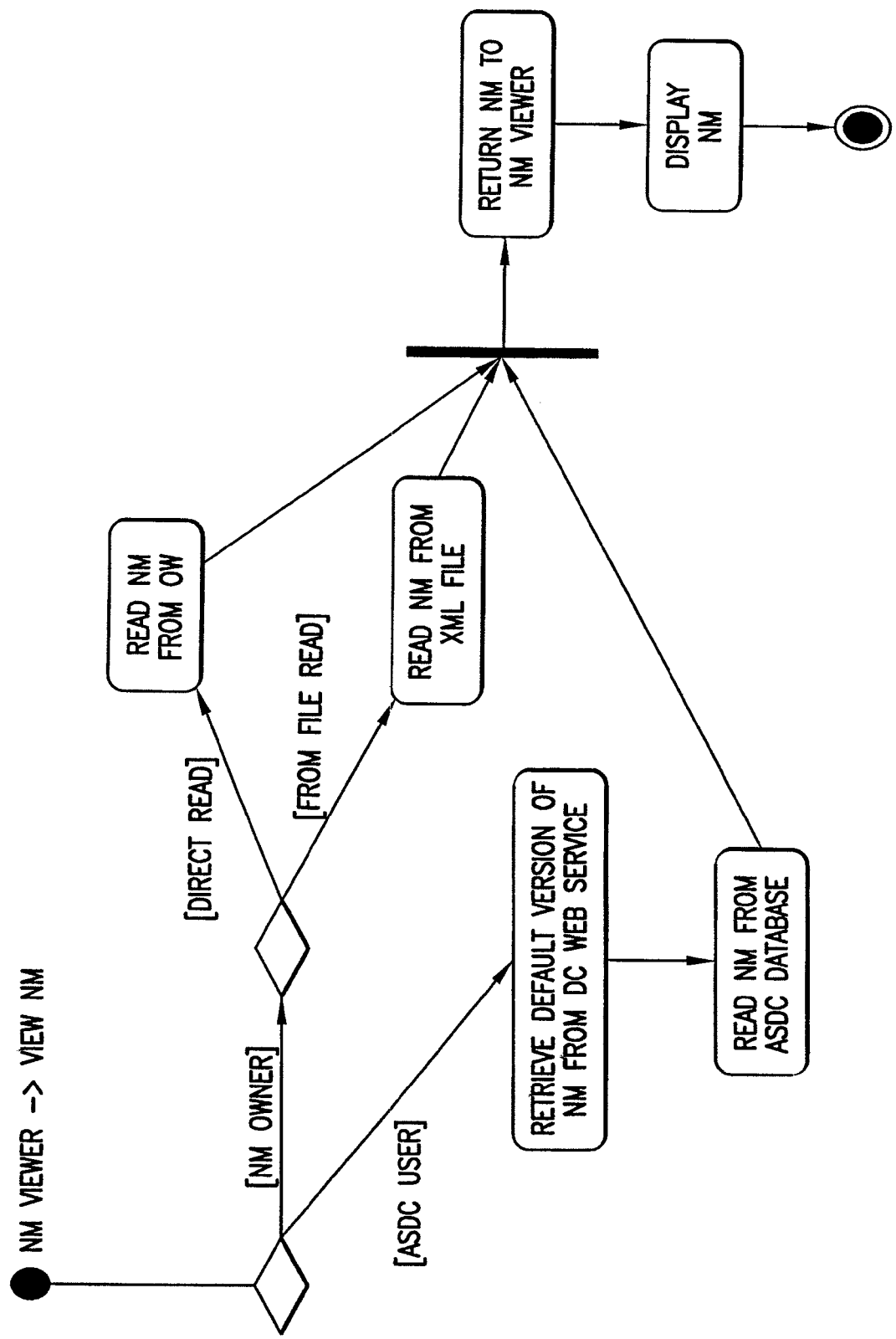
FIG. 5B is a diagram of a viewer for the Neutral Model (NM) interface for a user to generate queries for querying the distributed databases.

There are two primary user bases for this capability: XDDC users, and XDDC system personnel. For standard users, the graphical representation of the ontology is meant to act as an aid to query building. A user can opt to display the XML schema representation of the ontology in the viewer to heuristically formulate a query. Then, the query can be formalized into Semantic XQuery for processing. XDDC system personnel use the viewer to assist in developing or enhancing ontology, or mappings to customer data systems. The viewer provides an effective way to look at the structure of the ontology, thereby making it easier to develop and manage ontologies and mappings. Referring to FIG. 5B, the XDDC Query Builder (GUI labeled "NM Viewer") allows the NM Owner to do a direct read of ontologies from the Owner's ontology (file read from an XML file). It allows an XDDC user to retrieve a given version of the ontologies from the Webservice to read from the XDDC database. All viewing activity ends with return to the NM viewer and display of results.

COTS Adapters

Commercial off-the-shelf (COTS) components are used in two of the major parts of the runtime system: the ontology engine, which serves ontological data and provides deductive reasoning capabilities on semantic models; and the data integration engine, which provides a single query interface to disparate data sources. It is sometimes necessary that these COTS components be exchanged for different ones. If internal subsystems are strongly coupled to the COTS components, then a swap can be expensive and difficult, requiring various components to be re-worked and new code written. Also, usage patterns and strategies can change, further exacerbating the problem.

A solution is to shield internal subsystems from direct interaction with COTS components by having them use a "standardized" interface through an adapter. Using this approach, internal subsystems can be shielded from changes in COTS implementations, allowing for loose coupling and greater flexibility. This interface does not necessarily have to be standardized on an industry or enterprise scope, but it must at least remain static across implementations that could be used in the system. However, decoupling the COTS interface, or API, from internal subsystems requires more than knowledge about which methods/functions to call; it is also necessary to follow the specific usage patterns. Often methods must be called using a choreography that may or may not be statically defined. Also, parameters must be passed and return values received in a generic way.

Figure 6A:
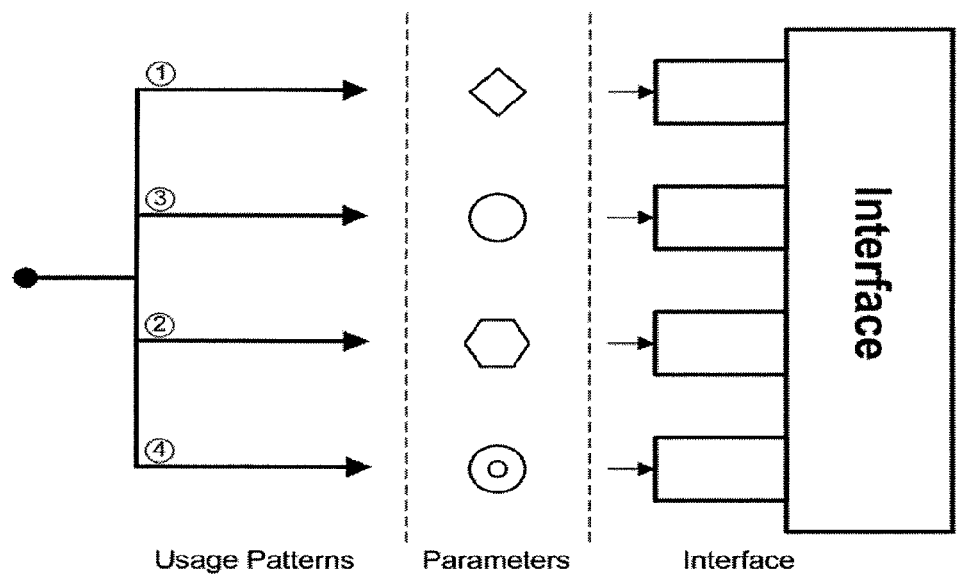
FIG. 6A illustrates issues of interface design, parameter passing, and usage patterns in creating a generic adapter for COTS components used in the system.

The problem of creating a generic adapter design boils down to three separate but related issues: interface design, parameter passing, and usage patterns, as illustrated in FIG. 6A. Interface design and parameter passing can each be handled with their own solution. Modeling usage patterns in a generic way is a more elusive problem than the other two, but by using a combination of the interface and parameter passing solutions, this can be solved in most cases. It is important that each of these three issues be handled in a generic way to effectively decouple the internal subsystems from the COTS components.

Figure 6B:
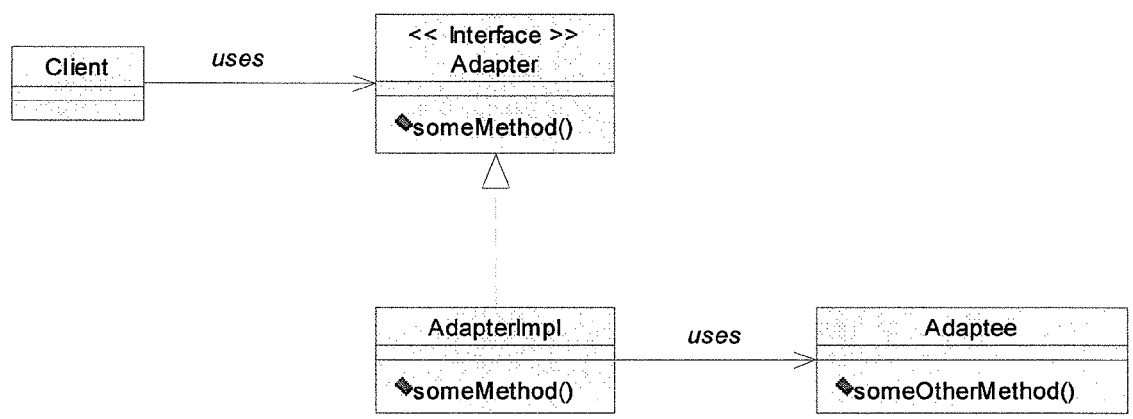
FIG. 6B illustrates a generic adapter pattern that can be used as a template that is customized to fit the needs of each individual COTS component.

As an improvement developed in the present invention, an implementation for a generic adapter for COTS components is structured into two parts: the interface, and a mechanism for passing generic arguments. Usage pattern variations can be handled with a combination of these two approaches. As shown in FIG. 6B, the adapter consists of an Interface that defines the functionality, and a concrete implementation class "AdapterImpl". The "Client" is an internal subsystem, and the "Adaptee" is the COTS interface, or API. Client requests are passed through the Adapter Interface to invoke "someMethod". The Adapter Implementation communicates the invoked Method to the Adaptee (COTS API) which performs "someOtherMethod'.

The internal subsystems will each have an adapter created for their specific usage patterns. A generic adapter pattern will be used as a template that is customized to fit the needs of each individual component. As a simple example, the adapter for the Ontology Model may look something like FIG. 6C after customization for its specific usages. Since there can be several concrete adapter implementations existing in the system at a given time, there needs to be a flexible way to create instances of them. This is accomplished by making use of a factory pattern, as illustrated in FIG. 6D. In the factory pattern, each AdapterImpl type is assembled using modular components for "parameter passing", i.e., "getAdapter", "getParameter", and "getReturnParameter" (employed as further described below). There is a factory for each type of adapter in the system. The factory returns one of the concrete adapter implementations, depending on the type that is passed in as a parameter to the static factory methods.

Figure 6E:
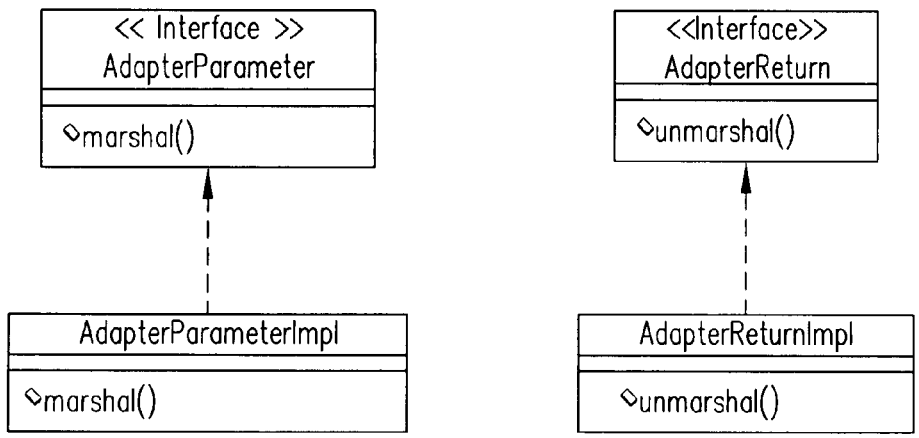
FIG. 6E illustrates a Command pattern used to represent arguments as objects that are responsible for marshalling and un-marshalling themselves in "parameter passing".
Figure 6F:
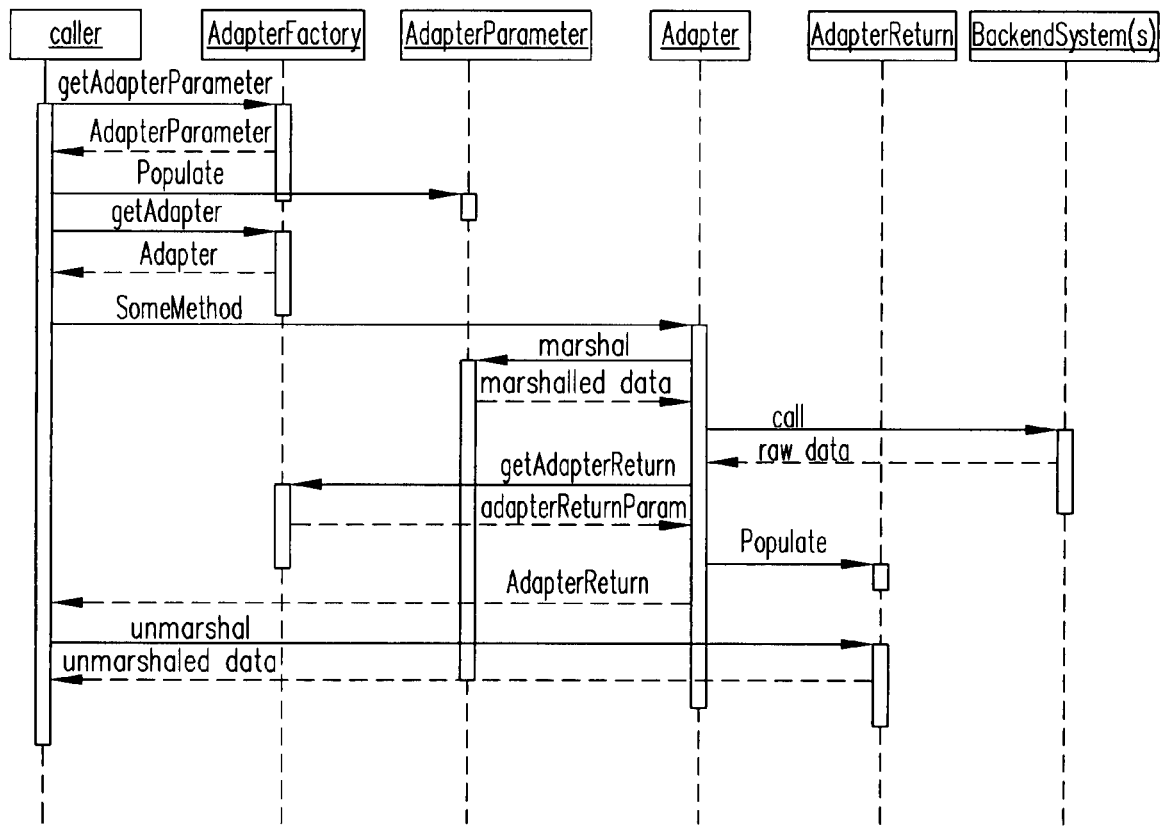
FIG. 6F illustrates a typical usage pattern for the "parameter passing" function of the generic adapter design.

Different COTS implementations will, in general, require different types of arguments to be passed, and return different values. Even if we define a "good" interface, parameters and return values can keep subsystems tightly coupled to the COTS components, effectively nullifying the advantages gained by using the adapter. To solve this problem, arguments and return values need to be handled in a way that is generic enough to accommodate almost any variation that is introduced into the system. To accomplish this, a Command pattern is used to represent arguments as objects that are responsible for marshalling and un-marshalling themselves, as illustrated in FIG. 6E. Their roles will be expanded upon when usage pattern variations are discussed. When a (software) client wishes to call the adapter interface, it first builds an AdapterParameter. The parameter is then sent to the interface via a method call. The interface implementation then calls the marshal method on the parameter, and the parameter implementation marshals its data into a form that the internal COTS piece can understand. After processing is completed, an AdapterReturn object is passed back to the client, and is un-marshaled. A typical usage pattern for "parameter passing" is shown in FIG. 6F. Using this approach, all of the logic for parameter customization is encapsulated in the AdapterParameter implementations. Note, however, that the quality of this approach is contingent on the quality of the AdapterParameter and AdapterReturn interface design.

Just as the effectiveness of the COTS adapter is determined largely by the quality of its interface design, the adapter parameter and return interfaces must be generic enough to support any arbitrary COTS-implementation. Each family of COTS components will have their own data-passing requirements that will determine the form of the parameter and return interfaces. However, the parameter interface for a family of COTS products MUST remain static, while the underlying implementation can change from product to product.

As mentioned previously, the third problem to be solved in order to implement an effective COTS adapter is the issue of usage pattern variations. There are an almost unlimited number of ways that usage patterns can vary, which makes a general solution very difficult. To accommodate usage pattern differences, we can make use of the Command pattern introduced for passing the parameters. But here, instead of using the AdapterParameter ONLY for parameter passing, we also use it as a formal command object. This means that the AdapterParameter contains not only parameters and the means for marshalling them, but also information and/or the means to execute the usage pattern in the correct way, using the correct choreography. In this way, usage patterns are encapsulated into the Command objects, with no impact to the COTS Adapter interface or client components. The effectiveness of this type of approach is contingent on the quality of the interface designs, both of the adapter and parameter/return command objects. Also, it is important that foresight into possible usage pattern variations be applied intelligently to these designs. The interfaces must remain static within a family of COTS implementations.

Figure 7A:
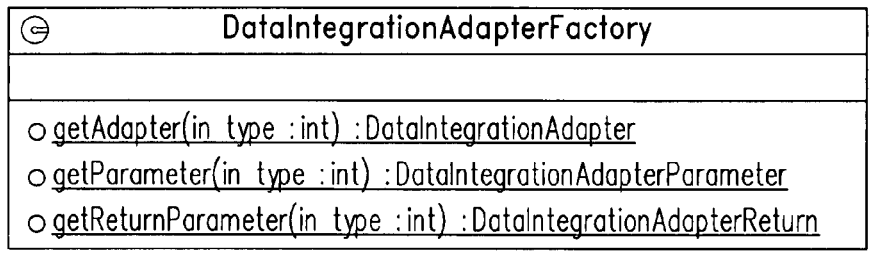
FIG. 7A shows an example of a data integration adapter factory.

An example of a Data Integration Adapter is illustrated to allow data integration components to be plugged into and out of the mediated query system with minimal impact. FIG. 7A shows an example of a data integration adapter factory. It contains methods for retrieving a data integration adapter, data integration parameter, and data integration return. Each of these methods accepts an indicator specifying the type of internal implementation desired. For instance, when the "getParameter" method on the DataIntegrationFactory is called, an object of type DataIntegrationAdapterParameter will be returned. But DataIntegrationAdapterParameter is merely an interface. The type of concrete implementation lying behind the interface is determined by the indicator passed to the factory. In general, the indicator will map to one of the COTS data integration engines that have been plugged into the internal subsystem via the adapter framework.

DataIntegrationAdapterParameter is basically a bean with various setter methods used to assign attributes for use when running a query. DataIntegrationAdapterReturn contains various methods for retrieving result data. It also contains several other methods such as "getStatus", which is used in asynchronous mode to check the status of a query. An important aspect of these components is contained within the "marshall" and "unmarshall" methods, existing within the DataIntegrationAdapterParameter and DataIntegrationAdapterReturn, respectively. It is the job of these methods to perform the transformations required when passing data in and out of the adapter framework. The "marshall" method on DataIntegrationAdapterParameter takes the various raw data elements specified within the parameter and performs the necessary operations to transform them into a data-structure suitable for processing in the back-end data integration engine. Similarly, method "unmarshall" on DataIntegrationAdapterReturn transforms raw results received by the back-end integration engine into a form that can be processed by the software modules external to the adapter framework. Both the "marshall" and "unmarshall" methods are defined in a general way in the adapter parameter and return interfaces. Implementing classes contain code specific to the back-end integration engine that performs the necessary transformations.

Figure 7B:
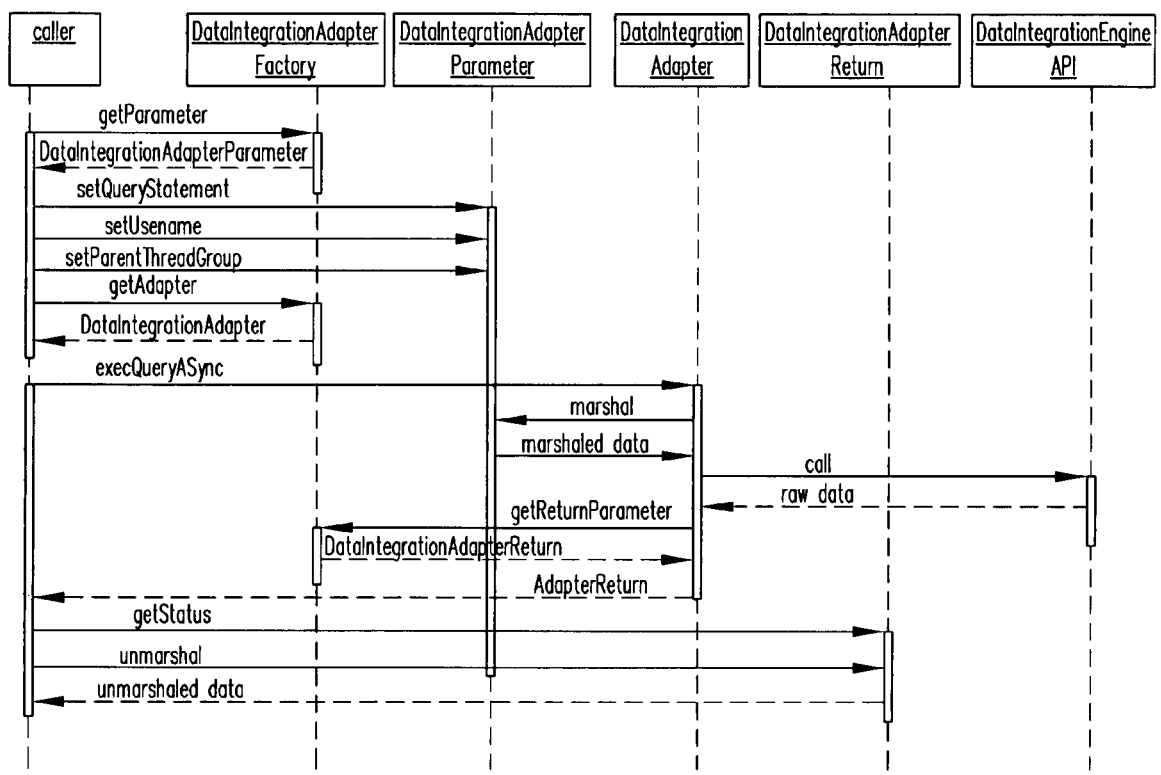
FIG. 7B shows a typical usage pattern for the Data Integration Adapter.

FIG. 7B shows a typical usage pattern for the Data Integration Adapter. First, the caller requests and receives an adapter parameter from the adapter factory. Next, the caller sets various values in the parameter, as needed. The caller then requests an adapter implementation, passes the parameter to the adapter, and in this case executes a query asynchronously. The adapter marshals the data in the parameter and interacts with the back-end data integration engine API. It also requests a parameter return object from the adapter factory and returns a reference to the caller. The caller polls the adapter return for status by calling the "getStatus" method periodically until the query is complete. At that point, method "unmarshall" is called on the adapter return and the caller receives the result data in a recognizable format.

SUMMARY

In summary, the method and associated system according to one or more embodiments of the invention employ the principles of mediated information integration. A neutral ontology model is constructed to serve as a conceptual representation of the information domain to resolve the heterogeneity of the member data systems. A logical/physical schemata is constructed to encapsulate each member data system by providing a logical representation of the system's content. These logical elements are mapped to concepts in the ontological model and together "mediate" the system information requests. Many modifications and variations may of course be devised given the above description of the principles of the invention. It is intended that all such modifications and variations be considered as within the spirit and scope of this invention, as defined in the following claims.

The invention claimed is:

1. A method on a computer for processing queries for data from any of a plurality of different databases on a network coupled to the computer, each database having a respective logical/physical schema which is different from those of others of the plurality of databases, comprising:

constructing a neutral ontology model of a query front end characterized by ontology schemata which subsume the plurality of different databases on the network in order to provide a common semantic interface for use in generating queries for data from any of the different databases;

importing respective database metadata representing logical and physical structures of each database subscribed for receiving queries for data from the database using the query front end;

constructing mappings of the database metadata, including database schemata representing the logical and physical structures of each subscribed database, to the ontology schemata of the query front end, wherein the mappings between the database schemata and the neutral ontology schemata connect each database schematic element with one or more corresponding ontology schemata concepts in the neutral ontology model based on semantic equivalence; and storing the constructed mappings for use by the query front end for queries through the common semantic interface of the neutral ontology model for data from any of the different databases, whereby said method provides user access to the different databases on the fly through a common semantic interface that provides users to query the different databases without knowledge of those databases.

2. The method according to claim 1, wherein the constructing of the neutral ontology model includes: collecting data that will be represented in the databases with corresponding data structure definitions to be used as a basis for conceptual ontology terminology used in the neutral ontology model; analyzing data relationships of the databases for the conceptual ontology terminology; defining an initial ontology in agreement with all included databases; and developing a lexical ontology of the conceptual ontology terminology to be used for the common semantic interface to the included databases.

3. The method according to claim 1, wherein the importing of the database metadata includes: physical models identifying the layout of data in each database; logical models identifying conceptual relationships within the data of each database; and data dictionaries providing textual descriptions of the defined data elements.

4. The method according to claim 1, wherein the constructing of mappings includes:

mappings between ontology and lower level schemata elements; mappings between ontological queries and lower level queries; and mappings between local security policies and global security policies.

5. The method according to claim 1, wherein the constructed mappings of database metadata to ontology schemata are stored in a repository used by the query front end, and at run time mapped ontology relationships are combined with controlling logical assertions in a forward chaining manner to infer connections between conceptual query terminology and the data structures of the subscribed databases on the fly.

6. The method according to claim 1, wherein the constructing of mappings includes storing: metadata modeling each database to be mapped to the ontological schemata for the neutral ontology model; mappings correlating database metadata to the neutral ontology model; and any changes to the data content of the databases that must be performed in order for the mappings to be accurately represented by the neutral ontology model.

7. The method according to claim 1, wherein the constructing of mappings includes steps of importing local metadata for each of the subscribed databases, importing the ontology schemata for the neutral ontology model, and defining mappings between the local database metadata and the ontology schemata.

8. The method according to claim 1, wherein the stored mappings of the query front end are used by a semantic query engine to translate semantic queries in high-level semantic terminology into low level database queries, and transform retrieved data from the low level queries into instantiations of the neutral ontology model.

9. A computerized software-programmed system on a computer for accessing data from a plurality of different databases on a network coupled to the computer, each database having its own logical/physical schema which is different from those of others of the plurality of databases, comprising:
- a query front end based on a neutral ontology model characterized by ontology schemata which subsume the plurality of different databases on the network in order to provide a common semantic interface for use in generating queries for data from any of the different databases;
- a repository for storing mappings of respective database metadata, including database schemata representing logical and physical structures of each database to the ontology schemata of the query front end, wherein the mappings between the database schemata and the neutral ontology schemata connect each database schematic element with one or more corresponding ontology schemata concepts in the neutral ontology model based on semantic equivalence; and
- a semantic query interface which uses the mappings stored in the repository to translate user queries in high-level semantic terminology into low level database queries to the different databases on the fly, and transform data retrieved from respective databases in response to the low level queries into instantiations of data retrieval within the neutral ontology model without the user needing to have knowledge of those databases.

10. The system according to claim 9, wherein the system is implemented as a Web Service that allows integration into net-centric database architectures.

11. The system according to claim 9, wherein the query front end includes a graphical user interface operates with a system architecture adaptation of a model-view-controller (MVC) pattern.

12. The system according to claim 9, wherein the query front end includes a mediator component that coordinates interactions between system components to process queries.

13. The system according to claim 9, wherein COTS adapters are used for interfacing between system components and commercial-off-the-shelf (COTS) components in order to process any COTS component to be adapted and interfaced to the system.

14. The system according to claim 9, having a model mapping and transformation tool providing an offline metadata repository for storing: metadata modeling each database to be mapped to the ontological schemata for the neutral ontology model; mappings correlating database metadata to the neutral ontology model; and any changes to the data content of the databases that must be performed in order for the mappings to be accurately represented by the neutral ontology model.

15. The system according to claim 9, having a mapping management tool providing a graphical interface and associated functions for automating the following tasks: importing local metadata of the subscribed databases; importing the ontology schemata for the neutral ontology model; and enabling graphically defined mappings between local database metadata and the ontology schemata for the neutral ontology model.

16. The system of claim 15, wherein the graphically defined mappings are provided by a user.

17. The system according to claim 13, wherein each COTS adapter is configured to be generic to COTS components as clients, and is provided with an interface to the associated internal system component and a method-invoking-mechanism for passing generic arguments as method calls to an associated COTS component.

18. The system according to claim 17, wherein said method-invoking-mechanism employs a command pattern to represent arguments as objects that execute marshalling and un-marshalling methods on themselves, such that when a COTS client acts to call the adapter interface, said method-invoking-mechanism first builds an AdapterParameter that is sent to the interface via a method call, the interface calls the marshalling method on the parameter, and the AdapterParameter implementation marshals its data into a form the COTS client can receive, and after processing by the COTS client results in a data return, an AdapterReturn object is passed back to the COTS client, and the un-marshalling method is called to un-marshall the command pattern.

19. The system according to claim 18, wherein the AdapterParameter is also used as a formal command object which contains not only parameters and means for marshalling them, but also means to execute an adapter usage pattern specifically for a particular COTS client, such that the adapter usage pattern is encapsulated into the command object and has no impact on the adapter interface or the COTS client.

20. The method according to claim 1, for configuring a software adapter for use in interfacing between an internal computerized system component and an external commercial-off-the-shelf (COTS) software product for one or more of the different databases comprising:
- providing the adapter with an interface to the internal system component and a method-invoking-mechanism for passing generic arguments as method calls to the associated COTS component as a client, and
- employing a command pattern of the method-invoking-mechanism to represent arguments as objects that execute marshalling and un-marshalling methods on themselves, such that when the COTS client acts to call the adapter interface, the method-invoking-mechanism first builds an AdapterParameter that is sent to the interface via a method call, the interface calls the marshalling method on the parameter, and the AdapterParameter implementation marshals respective data into a form the COTS client receives, and after processing by the COTS client results in a data return, an AdapterReturn object is passed back to the COTS client, and the un-marshalling method is called to un-marshall the command pattern.

21. The method according to claim 20, wherein the AdapterParameter is also used as a formal command object which contains not only parameters and means for marshalling them, but also information and/or means to execute an adapter usage pattern specifically for the particular COTS client, such that the adapter usage pattern is encapsulated into the command object and has no impact on the adapter interface or the COTS client.

* * * * *